US010644615B2

(12) United States Patent
Nagata et al.

(10) Patent No.: US 10,644,615 B2
(45) Date of Patent: May 5, 2020

(54) ELECTROSTATIC INDUCTION GENERATOR

(71) Applicant: CITIZEN WATCH CO., LTD., Tokyo (JP)

(72) Inventors: Yoichi Nagata, Saitama (JP); Akira Shiota, Saitama (JP); Makoto Watanabe, Saitama (JP); Akira Izumi, Tokyo (JP); Takashi Ihara, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 482 days.

(21) Appl. No.: 15/543,179

(22) PCT Filed: Jan. 5, 2016

(86) PCT No.: PCT/JP2016/050143
§ 371 (c)(1),
(2) Date: Jul. 12, 2017

(87) PCT Pub. No.: WO2016/114176
PCT Pub. Date: Jul. 21, 2016

(65) Prior Publication Data
US 2018/0026552 A1    Jan. 25, 2018

(30) Foreign Application Priority Data

Jan. 15, 2015  (JP) ................................. 2015-005716
Jul. 1, 2015   (JP) ................................. 2015-133006

(51) Int. Cl.
*H02N 1/08*      (2006.01)
*G04C 3/027*     (2006.01)
(Continued)

(52) U.S. Cl.
CPC .................................... *H02N 1/08* (2013.01)

(58) Field of Classification Search
CPC ... H02N 1/00; H02N 1/06; H02N 1/08; G04C 3/008; G04C 3/02; G04C 3/024; G04C 3/027; G04C 3/0273; G04C 10/00
See application file for complete search history.

(56) References Cited

U.S. PATENT DOCUMENTS 2,318,935 A * 5/1943 Fisher ...................... H02N 1/08
                                                    361/289
3,696,258 A * 10/1972 Anderson ................ G04C 3/16
                                                    310/308

(Continued)

FOREIGN PATENT DOCUMENTS

CN      102640411 A    8/2012
CN      102656793 A    9/2012
(Continued)

OTHER PUBLICATIONS

International Search Report for PCT/JP2016/050143, dated Mar. 29, 2016.

(Continued)

*Primary Examiner* — Edgardo San Martin

(57) ABSTRACT

An electrostatic induction generator includes a housing, a first board fixed to the housing, and a second board arranged in parallel to the first board to be able move relative to it, in which electrostatic induction generator, counter electrodes are placed at a first facing surface of the first board, electrically charged films are placed at every other constant interval at a second facing surface of the second board so as to face the counter electrodes, the counter electrodes are comprised of pluralities of first electrodes and second electrodes provided separated from each other at the first facing surface, first electrodes and second electrodes are alternately arranged at constant intervals in a single line, a plurality of lines of single lines of the first electrodes and second electrodes are provided at the first facing surface, and the (Continued)

constant intervals of the plurality of lines respectively differ in phase.

17 Claims, 27 Drawing Sheets

(51) Int. Cl.
*H02N 1/00* (2006.01)
*H02N 1/06* (2006.01)
*G04C 3/02* (2006.01)

(56) References Cited

U.S. PATENT DOCUMENTS

| | | | | |
|---|---|---|---|---|
| 6,472,795 | B2* | 10/2002 | Hirose | H02N 1/008 |
| | | | | 310/309 |
| 7,239,065 | B2* | 7/2007 | Horst | H02N 1/004 |
| | | | | 310/309 |
| 8,018,119 | B2* | 9/2011 | Matsubara | H02N 1/08 |
| | | | | 310/309 |
| 8,441,167 | B2* | 5/2013 | Verkoglyad | H02N 1/08 |
| | | | | 310/309 |
| 9,184,676 | B2* | 11/2015 | Ludois | H02N 1/00 |
| 10,110,146 | B2* | 10/2018 | Post | H02N 1/08 |
| 2004/0007877 | A1 | 1/2004 | Boland et al. | |
| 2010/0072855 | A1 | 3/2010 | Matsubara et al. | |
| 2010/0194236 | A1 | 8/2010 | Verkoglyad et al. | |
| 2013/0076202 | A1 | 3/2013 | Naito et al. | |
| 2013/0106317 | A1* | 5/2013 | Ludois | H02N 1/00 |
| | | | | 318/116 |
| 2013/0134828 | A1 | 5/2013 | Okada et al. | |
| 2013/0134830 | A1 | 5/2013 | Ikuta et al. | |
| 2017/0141701 | A1* | 5/2017 | Rhee | H02N 1/08 |

FOREIGN PATENT DOCUMENTS

| | | |
|---|---|---|
| JP | 2005-529574 A | 9/2005 |
| JP | 2010-534052 A | 10/2010 |
| JP | 5205193 B2 | 2/2012 |
| JP | 2012-138514 A | 7/2012 |
| JP | 2013-059149 A | 3/2013 |
| JP | 2013-135544 A | 7/2013 |
| JP | 5460872 B2 | 1/2014 |
| WO | 2011/052106 A1 | 5/2011 |

OTHER PUBLICATIONS

Written Opinion of the International Searching Authority for PCT/JP2016/050143, dated Mar. 29, 2016.

* cited by examiner (a)

(b)

(a)

(b)

(c)

(a)

(b)

(a)

STATE A (b)

STATE $N_B$ (c)

STATE C (d)

STATE $N_A$ (e)

STATE B (f)

STATE $N_C$ (a)

(b)

(c)

(d)

(a)

(b)

(a)

(b)

(c)

(a)

(b)

(c)

STATE a

STATE b

ELECTROSTATIC INDUCTION GENERATOR

TECHNICAL FIELD

The present invention relates to a power generation system utilizing electrostatic induction, a generator, a portable electrical device, a portable timepiece, etc. As the source of energy of the generator of the present invention, it is possible to use motion of the human body, vibration of a machine etc., and other kinetic energy widely available in the environment. In particular, it relates to a generator in electret power generation where the phases of the counter electrodes etc. are increased.

BACKGROUND ART

A practical power generation system utilizing electrostatic induction by an electret material is disclosed in PLTs 1 to 6 etc. "Electrostatic induction" is the phenomenon where if making a charged object approach a conductor, a charge of the opposite polarity to the charged object is induced. A power generation system utilizing the phenomenon of electrostatic induction is comprised of a "film holding a charge" (below, referred to as an "electrically charged film") and a counter electrode. It utilizes this phenomenon and makes the two move relatively to induce a charge to be taken out.

FIG. 1 is an explanatory view schematically explaining the principle of power generation utilizing the phenomenon of electrostatic induction. In FIG. 1, the counter electrode side is made to move, but the electrically charged film side may also be made to move.

If taking as an example the case of an electret material, an electret has a dielectric material into which a charge is injected and is a type of electrically charged film generating an electrostatic field semipermanently. In power generation by an electret, as will be seen in FIG. 1, the electrostatic field formed by the electret 3 causes an induced charge to be generated at a counter electrode (electrode) 2. If making the area of overlap of the electret 3 and counter electrode 2 change (due to vibration etc.), it is possible to cause the generation of an AC current at an outside electrical circuit E. This power generation by an electret is advantageous in the point that the structure is relatively simple and a higher output is obtained in the low frequency region compared with power generation by electromagnetic induction. This has therefore been the focus of attention in recent years as so-called "energy harvesting".

FIGS. 18(a) to (c) are views showing an outline of counter electrodes and electrically charged films of PLT 1 as prior art. FIGS. 19(a) to (c) are views explaining the counter electrodes and electrically charged films of PLT 1. FIG. 20 are explanatory views for explaining the Coulomb forces acting on the areas of the overlapping parts of electrically charged films 3 and first electrodes A and second electrodes NA of the counter electrodes 2 of FIGS. 19.

PLT 1 discloses a power generation system utilizing electrostatic induction in which electrically charged films and counter electrodes engage in reciprocating periodic rotation. As one embodiment of this prior art, unlike the schematic view of FIG. 1, an embodiment is shown in which electrodes taken out as output are formed only on the counter board. As shown in FIG. 18(a), the bottom surface of the rotating member 4 is formed with electrically charged films 3. The fixed side counter board 1 is alternately formed with a plurality of first electrodes A and a plurality of second electrodes NA. Reference notation 13 is a spiral spring set between the rotating member 4 and a shaft 8. Reference notation 10 is a rotating weight (rotor).

The plurality of first electrodes A are electrically connected with each other. An interconnect 90A is used to take out the generated power. The plurality of second electrodes NA are also electrically connected with each other. An interconnect 90N is used to take out the generated power at a rectifying circuit 92. The voltages output from the first electrodes A and the second electrodes NA are alternately generated by electrostatic induction, so a waveform of an alternating current offset by a half cycle phase is output. The interconnect 90A connected to the first electrodes A on the counter board 1 and the interconnect 90N connected to the second electrodes NA are connected to the rectifying circuit 92 using diodes 91. The rectified power is connected to a storing member 93 using a capacitor or secondary cell etc. The power charged at the storing member 93 drives a later stage electronic device circuit 94. In the embodiment of PLT 1 where the electrodes are formed only on the counter board, current can be taken out from the fixed side counter board, so the design is convenient (there is no need to take out current from the rotating member).

At the bottom surface of the rotating member 4, electrically charged films 3 such as shown in FIG. 19(a) are formed. The parts of the rotating member 4 between electrically charged films 3 and other electrically charged films 3 are formed with holes. On the other hand, as shown in FIG. 19(b), as the counter electrodes 2 on the counter board 1 fixed at a position facing the electrically charged films 3, first electrodes A and second electrodes NA are alternately formed. The first electrodes A and the second electrodes NA are respectively connected with each other. The interconnects 90A and 90N taken out from the first electrodes A and the second electrodes NA are connected to the rectifying circuit 92 using the diodes 91 and, furthermore, are connected to the storing member 93 using a capacitor or secondary cell etc.

The voltages output from the first electrodes A and the second electrodes NA are alternately generated by electrostatic induction due to the rotation of the rotating member 4, so a waveform of an alternating current is output. FIG. 18(c) shows the arrangement of the electrically charged films 3 and counter electrodes 90A and 90N when viewed from the circumferential side surface of the rotating member 4. The counter electrodes 90A and 90N are alternately arranged. The electrically charged films are arranged at the same intervals as those between the counter electrodes 90A or 90N. If the rotating member 4 is made to rotate, the electrically charged films and the counter electrode face each other by any of the positional relationships of FIGS. 18(b) and (c). That is, as shown in FIG. 18(b), if a first electrode A faces an electrically charged film 3, the first electrode A attracts a plus charge and current flows in one direction. Simultaneously, at a second electrode NA at a position not facing an electrically charged film 3, the attracted plus charge is dissipated and current flows in the opposite direction to the above direction. Next, the rotating member 4 rotates resulting in FIG. 18(c). FIGS. 18(c) and (b) are repeated. Specifically, a first electrode A at a position facing an electrically charged film 3 formed at the rotating member 4 and a second electrode NA at a position not facing an electrically charged film 3 become opposite in polarity, so the interconnects 90A and 90N are connected to different input terminals of the rectifying circuit 92. The alternating current output from the power generation system is converted to direct current by the rectifying circuit 92 and charged into the storing member 93. If electric power sufficient for driving an electronic device circuit 94 connected at a later stage is charged, the later stage electronic device circuit 94 can be driven.

FIG. 19(*c*) shows the arrangement of electrically charged films 3 and counter electrodes A and NA and the effect of the Coulomb forces when viewing the rotating member 4 with the electrically charged films of FIG. 19(*a*) and the counter electrodes of FIG. 19(*b*) facing each other as seen from the circumferential side surface. A "Coulomb force" is the force of attraction acting between charges of opposite polarities. The force of attraction becomes greater the larger the charges. Due to the arrangement of the first electrodes A and second electrodes NA of FIG. 19(*b*), as shown in FIG. 19(*c*), a Coulomb force acts between an electrically charged film 3 and an electrode A (or second electrode). Due to the component F of its direction of movement, a sawtooth shaped holding torque such as shown in FIG. 20(*b*) ends up acting on the rotating member. Note that, the first electrodes A and the second electrodes NA of FIG. 20(*a*) are inherently fan shaped, but for facilitating the explanation are shown as rectangular shapes.

When the rotating member 4 stops, it stops at a position where the holding torque of the rotating member 4 becomes maximum, that is, the position where the overlapping areas of the electrically charged films 3 and electrodes A or NA become maximum. Therefore, at the time of start of rotation of the rotating member 4, the rotating member 4 will not rotate and external vibration cannot be converted to power even if applied unless a rotating force greater than the peak value of the holding torque is applied. Accordingly, if a sawtooth shaped holding torque such as shown in FIG. 20(*b*) ends up acting on the rotating member, the extremely high peak value of the holding torque ends up raising the threshold value of the initial torque of the rotating member 4 and there is a limit to further improvement of the efficiency of energy conversion from external vibration of environmental vibration. Further, looking at the continuity of rotation and vibration of the rotating member 4 obtained from environmental vibration as well, peak values of the holding torque repeatedly occur making it impossible to obtain rotation or vibration continuing for longer periods of time.

PLT 2 also discloses a rotary type power generation system utilizing electrostatic induction where electret films and counter electrodes engage in reciprocating periodic rotation. Electret films are formed at the inner surface of a rotating member and counter electrodes are formed at a fixed side counter board facing it. The electret films of the rotating side and the counter electrodes of the fixed side are used as electrodes to take out current. In PLT 2, current has to be taken out from the rotating side electrets as well, so this is troublesome.

In the prior arts of PLTs 1 and 2, in each case, the electrically charged films and the counter electrodes of the facing board are made the same shapes and power is generated by relative movement of the positional relationship of the electrically charged films and counter electrodes. In the case of such a structure, in electret power generation, Coulomb forces Q are generated between the electrically charged films and counter electrodes, so the initial torque required for the rotating member to start to move has to be a torque of the Coulomb forces or more. Further, even when the torque transmitted to the rotating member is gone and the rotating member rotates by inertia, rotation stops when the inertia becomes the Coulomb forces or less. For this reason, to improve the power generation efficiency of electret power generation, it is necessary to reduce the Coulomb forces generated between the electrically charged films and counter electrodes. PLT 3 discloses a type where the electret films and counter electrodes engage in translational motion, but again a similar problem arises.

As opposed to the prior arts of the above PLTs 1 to 3, in each of the electrostatic induction type power generation systems using electret films of PLTs 4 and 5, a movable board engaging in reciprocating motion is sandwiched between a top fixed board and bottom fixed board. The top and bottom surfaces of the movable board are respectively formed with electret films. Counter electrodes facing the electret films on the top surface of the movable board are provided on the top fixed board, while counter electrodes facing the electret films on the bottom surface of the movable board are provided on the bottom fixed board. The phases of the pitch of the counter electrodes and electret films in the direction of movement are offset from each other between the top part and bottom part of the movable board to reduce the Coulomb forces, reduce the initial torque at the time of power generation, and improve the power generation efficiency. However, the dual top-bottom surface type of PLTs 4 and 5 has the following problem.

In the dual top-bottom surface type, the Coulomb forces can be cancelled out only when the top surface electrically charged films and the bottom surface electrically charged films are equal in amounts of electric charge. The movable board has to be positioned at an accurate intermediate position between the top fixed board and bottom fixed board to balance the Coulomb forces. For this reason, control of the positional precision of the movable board is difficult. On top of this, the amounts of electric charge mainly depend on the thicknesses of the electrically charged films. In the production process, not only do the film thicknesses end up varying, but also, since corona discharge is used for charging, the amounts of electric charge also often vary. Therefore, in the dual top-bottom surface type, making the amounts of electric charge of the top and bottom electrically charged films equal has been a considerably difficult problem.

Furthermore, to utilize the top and bottom surfaces of the movable board, there has to be a certain thickness in the vertical direction between the top fixed board and movable board and between the movable board and the bottom fixed board. There was therefore the problem that the power generation device became greater in thickness.

CITATION LIST

Patent Literature

PLT 1: Japanese Unexamined Patent Publication No. 2013-135544A

PLT 2: Japanese Unexamined Patent Publication No. 2013-59149A

PLT 3: Japanese Unexamined Patent Publication No. 2012-138514A

PLT 4: Japanese Patent No. 5460872B

PLT 5: Japanese Patent No. 5205193B

PLT 6: Japanese Unexamined Patent Publication No. 2005-529574A

SUMMARY OF INVENTION

The present invention is related to an electrostatic induction generator having lines of counter electrodes arranged offset in relative positions and cancelling out the Coulomb forces generated between the counter electrodes and electrically charged films, wherein the power generation ability is maintained while the precision of cancellation of Coulomb forces is raised to thereby reduce the power generation load and generate power by electrostatic induction with a good efficiency while keeping the structure thin.

The electrostatic induction generator includes a housing, a first board fixed to the housing, a second board arranged in parallel to the first board to be able to move relative to the first board, electrically charged films, counter electrodes, and output parts outputting an alternating current generated between the electrically charged films and counter electrodes, wherein the counter electrodes are set at a first facing surface of the first board, the electrically charged films are set at every other constant interval at a second facing surface of the second board so as to face the counter electrodes, the counter electrodes have pluralities of first electrodes and second electrodes provided separated from each other at the first facing surface, the first electrodes and the second electrodes are alternately arranged along the direction of movement at the constant intervals in a single line, the first electrodes and the second electrodes are respectively connected with each other, the first electrodes and the second electrodes are respectively connected to the output parts, at the first facing surface, a plurality of the single lines of the first electrodes and the second electrodes are set, and the constant intervals of the plurality of lines respectively differ in phase. By doing this, the Coulomb forces generated between the electrically charged films and counter electrodes are reduced.

In the above electrostatic induction generator, among the plurality of lines of counter electrodes or lines of electrically charged films in the direction of movement, the relative positions are offset in the same plane according to the number of the lines of counter electrodes or lines of electrically charged films to cancel out the Coulomb forces generated between the counter electrodes and the electrically charged films and thereby maintain the power generation ability while evenly managing the cancelled out Coulomb forces and thereby to be able to reduce the power generation load and enable good efficiency electrostatic induction power generation while keeping the structure thin.

DESCRIPTION OF EMBODIMENTS

Figure 1:
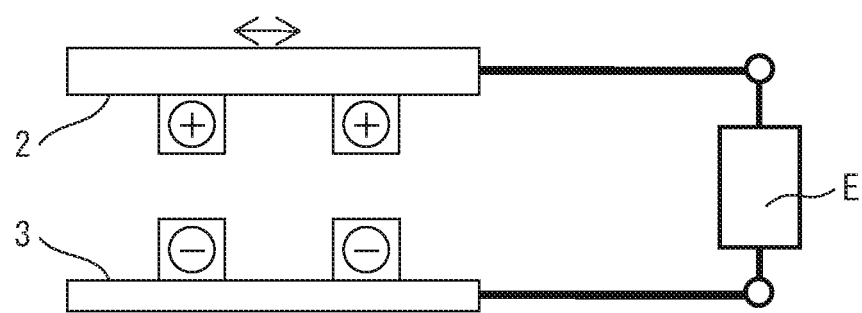
FIG. 1 is an explanatory view schematically explaining the principle of power generation utilizing the phenomenon of electrostatic induction.

Below, referring to the drawings, embodiments of the present invention will be explained. In the embodiments, the same constituent parts are assigned the same reference notations and their explanations are omitted. In the following embodiments, as one example, the explanation was given with reference to a wristwatch, but the invention is not necessarily limited to a wristwatch. It may be applied to any electronic or electrical device with an electrostatic induction generator for portable use.

First Embodiment

Figure 2:
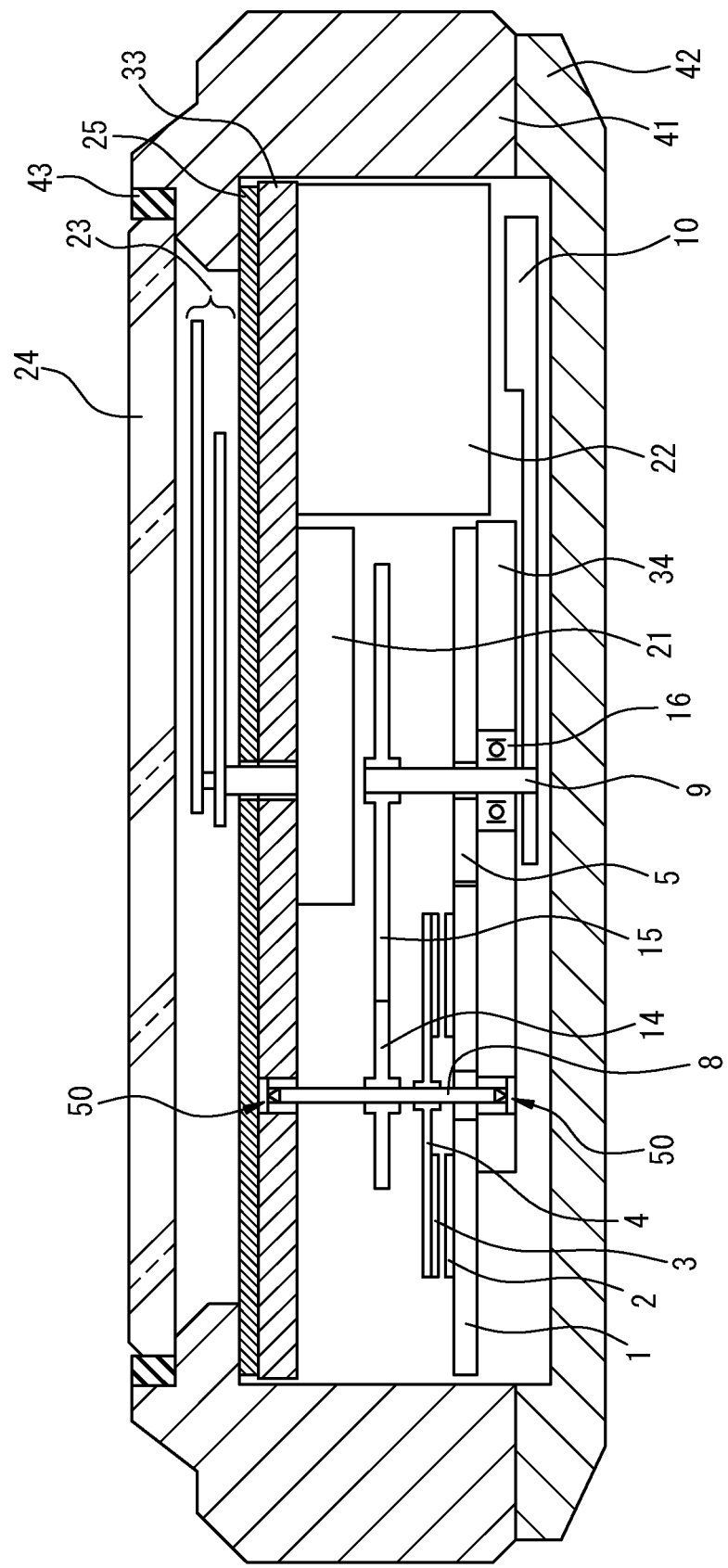
FIG. 2 is a schematic cross-sectional view relating to the line X-X of the first embodiment of the present invention (FIG. 3).
Figure 3:
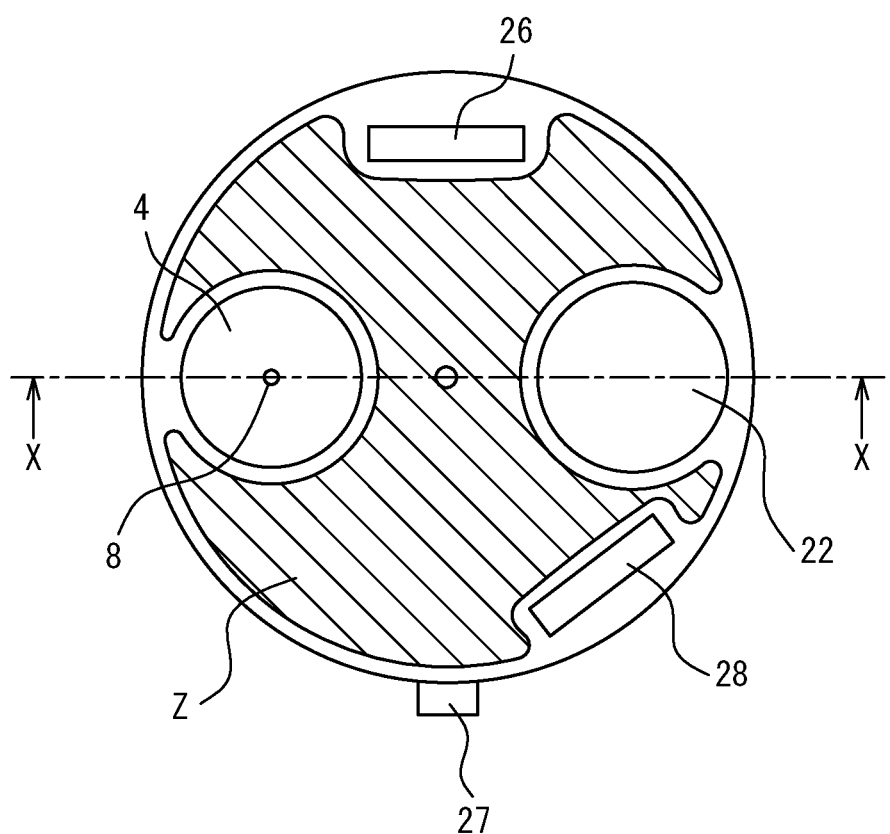
FIG. 3 is a view of an outline of the internal structure of the first embodiment of the present invention.
Figure 4:
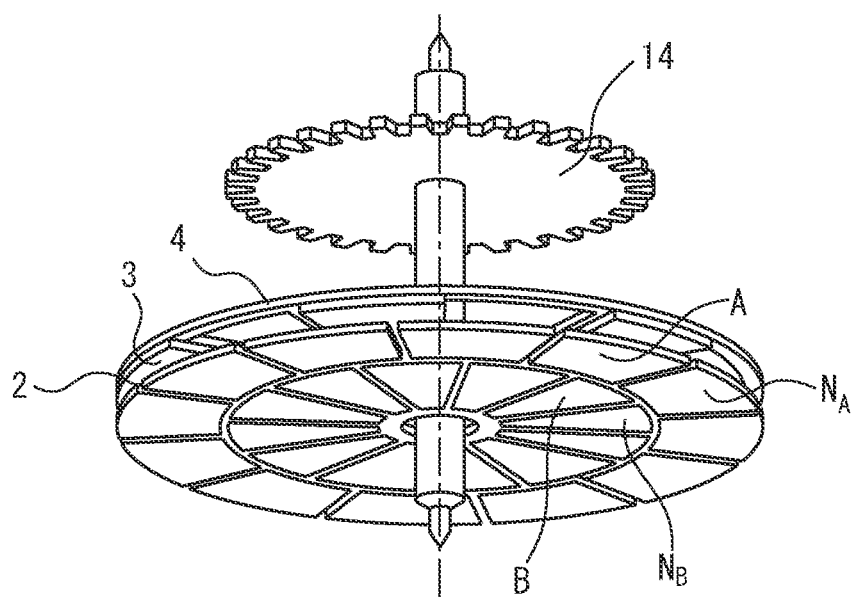
FIG. 4 is a partial perspective view for explaining the first embodiment of the present invention.
Figure 5:
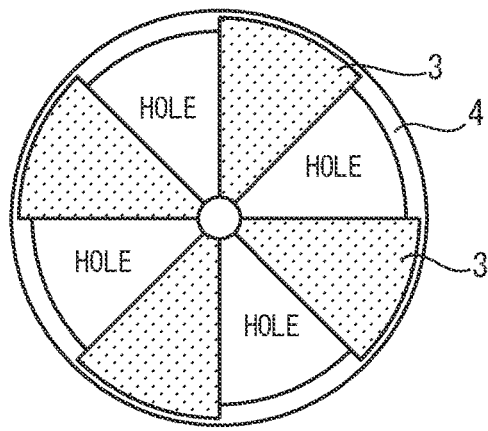
FIGS. 5(a) and (b) are views showing outlines of the counter electrodes and electrically charged films of the first embodiment of the present invention.
Figure 5:
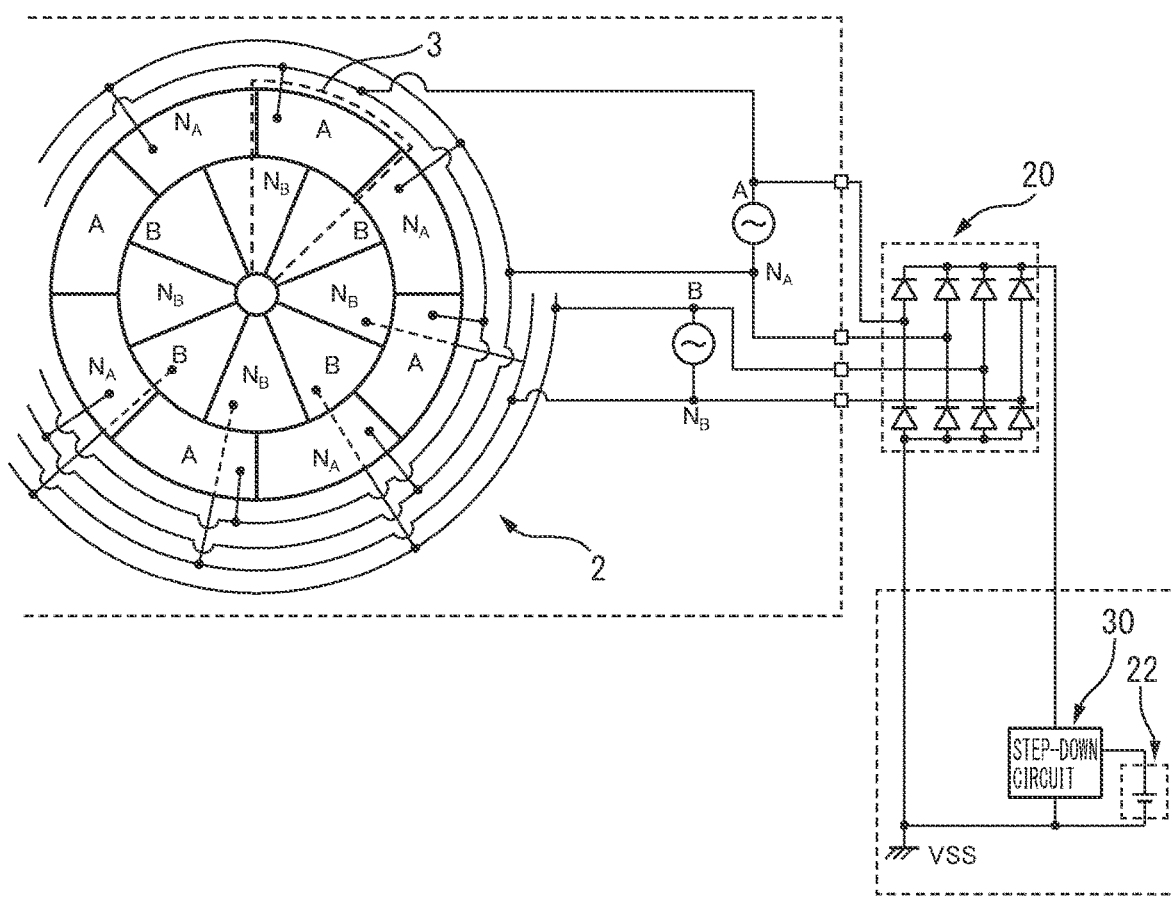
Figure 6:
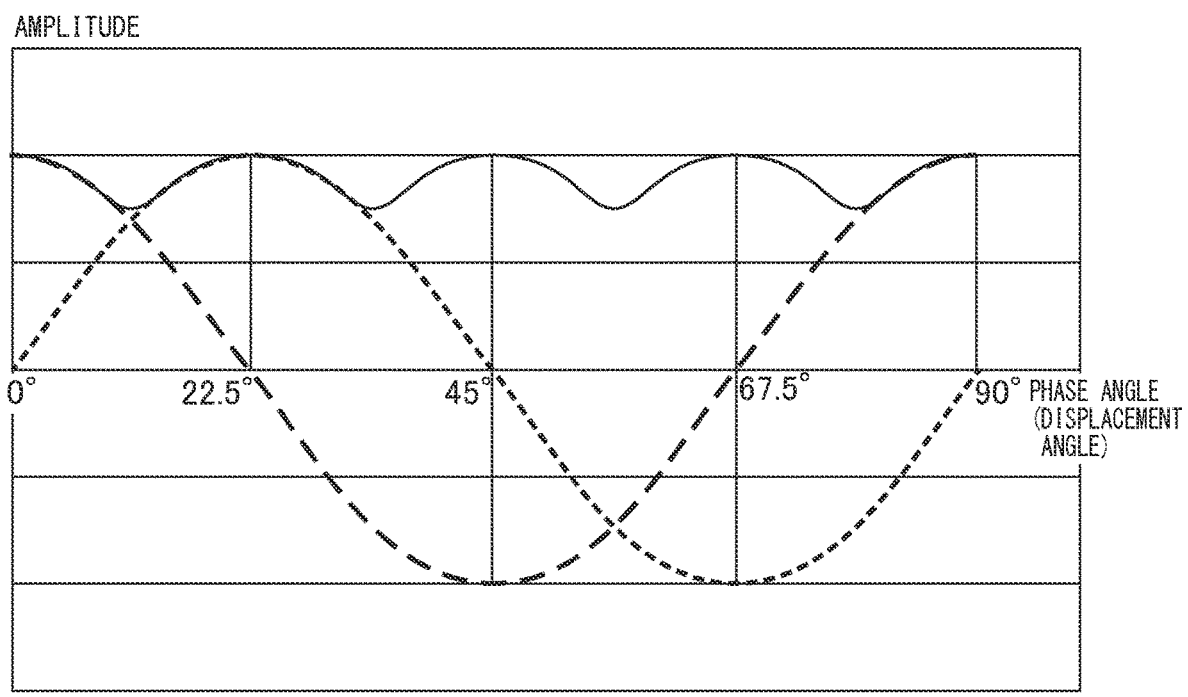
FIG. 6 is a graph showing the output from a rectifying circuit of the first embodiment of the present invention.

FIG. 2 is a schematic cross-sectional view relating to the line X-X of the first embodiment of the present invention (FIG. 3). FIG. 3 is a view of an outline of the internal structure of the first embodiment of the present invention. FIG. 4 is a partial perspective view for explaining the first embodiment of the present invention. FIG. 5 are views showing outlines of the counter electrodes and electrically charged films of the first embodiment of the present invention. FIG. 6 is a graph showing the output from a rectifying circuit of the first embodiment of the present invention.

Below, a first embodiment will be explained with reference to the drawings. The first embodiment is the case of application to a wristwatch or other portable electronic timepiece. A portable electronic timepiece, as shown in FIG. 2, has an external casing 41, 42 (case back 42) including a windshield (crystal) 24, dial 25, housing 33, 34, quartz movement arranged inside the housing, and electrostatic induction generator arranged inside the housing. The crystal 24 is fit into the external casing 41 through a packing 43. The crystal 24 is formed by a transparent material.

The housing will be explained below using terms frequently used in the case of wristwatches, that is, a main plate 33 and bridge 34. The main plate 33 is a type of housing and means the base in which various parts are assembled, the support plate, the internal casing, etc. Further, "bridge" is a term often used in the case of something performing the function of supporting the shaft of a rotating body or fastening and holding parts.

The "quartz movement" is defined here as including a crystal oscillator 28, a circuit board 5, a coil 26, a step motor provided with a motor use rotor and stator, hand movement gears, a secondary cell 22, etc. The circuit board 5 has an oscillation circuit, frequency division circuit, step motor drive circuit, rectifying circuit, power supply circuit, etc. assembled on it. A gear drive part 21 contains parts of the quartz movement such as the coil 26, step motor, hand movement gears, etc. As seen in FIG. 2, from the gear drive part 21, a hand shaft sticks out upward from the dial 25. An hour hand, minute hand, second hand (second hand not shown), and other hands 23 are attached to it. The hands 23 shown are only the hour hand and minute hand, but an hour hand, minute hand, and second hand may also be provided. FIG. 3 shows an outline of the timepiece internal structure such as the quartz movement and electrostatic induction generator. The part Z of FIG. 3 is the general region in which the main plate and part of the quartz movement are suitably arranged. Reference numeral 27 indicates the crown. In the part Z, in the quartz movement, the gear drive part 21, circuit board 5, etc. are arranged, but the layout may be suitably determined by the design.

Next, referring to FIG. 2, the overall configuration of the electrostatic induction generator will be explained. At the rotary shaft 8, a rotating member 4 is fixed. At the bottom surface of the rotating member 4, electrically charged films 3 are arranged. The rotating member 4 will also be referred to as the "second board". On the other hand, a counter board 1 on the top surface of which counter electrodes 2 are arranged is fastened set at a bridge 34 so as to face the electrically charged films 3. The counter board 1 will also be referred to as the "first board". The rotating member 4 is supported between the main plate 33 and the bridge 34 so that the parts are arranged in the order of the dial 25, main plate 33, rotating member 4, counter board 1, and bridge 34, but the invention is not limited to this. They may also be arranged in the order of the dial 25, main plate 33, counter board 1, rotating member 4, and bridge 34. The same is true in the later explained other embodiments.

In FIG. 2, the circuit board 5 of the quartz movement is also fastened set at the bridge 34 in the same way as the counter board. Here, to precisely manage the gap between the counter board 1 and the electrically charged films 3, the counter board 1 and the circuit board 5 are fabricated as separate members, but if a similar positional precision is satisfied, the circuit board 5 and the counter board 1 may also be formed on the same board. If the circuit board 5 and the counter board 1 are separate boards, connectors, conductive springs, connection terminals, etc. are used to establish conduction. The same is true in the later explained embodiments.

If the rotating member 4 rotates, electrostatic induction power generation is caused. The power generated between the electrically charged films 3 and the counter electrodes 2 is output to the quartz movement (circuit board 5). FIG. 4 shows schematically by a perspective view the state where the electrically charged films 3 are arranged at the bottom surface of the rotating member 4 and the counter electrodes 2 are arranged so as to face the electrically charged films 3. In the present embodiment, a gear transmission mechanism is used for transmission of force of the rotating weight 10, so the parts are arranged in the order, from the top part toward the bottom part, of the dial 25, main plate 33, gear 14, rotating member 4, electrically charged films 3, counter electrodes 2, counter board 1, and bridge 34.

At the counter board 1, as shown in FIG. 5(b), first electrodes A and second electrodes NA are alternately arranged at the outer circumference side while first electrodes B and second electrodes NB are alternately arranged at the inner circumference side. All of the first electrodes A and all of the second electrodes NA are connected with each other whereby a first alternating current is formed and input to the rectifying circuit 20. Similarly, all of the first electrodes B and all of the second electrodes NB are connected with each other whereby a second alternating current is formed and input to the rectifying circuit 20.

The electrically charged films 3 at the bottom surface of the rotating member, as shown in FIG. 5(a), are respectively formed in radial shapes. Between the radial shaped pieces, blank parts are formed. The rotary shaft 8 is supported at the top side by a bearing 50 of the main plate 33 and at the bottom side by a bearing 50 provided at the bridge 34 (the bearings 50 may also be shock protection systems, for example, a parashock). Note that, the invention can be worked even without forming blank parts at the rotating member 4.

To simplify the explanation of the arrangement of the electrically charged films or counter electrodes, below, these will be expressed by phases. The meaning of this is as follows: The electrically charged films and blank parts of the rotating member are alternately arranged by equal areas in the circumferential direction. When a counter board on which electrodes of equal areas to the electrically charged films are arranged in the circumferential direction is arranged coaxially in proximity, at the position where the overlapping areas of the electrically charged films and counter electrodes become the greatest when seen from the top surface, the greatest charge is induced at the counter electrodes, so the generated power becomes maximum. After that, as the electrically charged films separate from the counter electrodes, the induced charge is reduced. At the position where the electrically charged films and counter electrodes do not overlap at all, the generated power becomes the smallest. Due to rotation of the rotating member, these states are alternately repeated, so the waveform of the generated power becomes cyclic. From one position to the next position where the electrically charged films and the counter electrodes overlap, the waveform rotates 360 degrees in phase. At this time, the electrically charged films move in the circumferential direction by two times the widths of the electrically charged films. Therefore, when explaining the amounts of movement in the arrangements of the counter electrodes or electrically charged films, a difference in the relative positions of the amounts of two widths of the electrically charged films (in the case of rotation, displacement angle) will be read as a "phase" and will be called "1 cycle".

The line of electrodes of the first electrodes A and second electrodes NA and the line of electrodes of the first electrodes B and second electrodes NB are arranged so as to differ in phase by exactly one-quarter the cycle of one cycle of the alternating current. The line of electrodes of the first electrodes A and the second electrodes NA and the line of electrodes of the first electrodes B and the second electrodes NB will together be referred to as the "counter electrodes 2". The line of electrodes of the first electrodes B and the second electrodes NB may also be arranged to differ in phase from the line of electrodes of the first electrodes A and the second electrodes NA by exactly three-quarters of one cycle of the alternating current. In the embodiment of FIGS. 5(a), (b), four sets of the first and second electrodes are provided, but the invention is not limited to this. Any even number may be provided. The same is true in the following embodiments as well.

The rotating weight 10 rotates by catching the motion of the arm etc. As shown in FIGS. 2 and 4, at the top side of the rotating member 4 of the rotary shaft 8, the gear 14 is fixed to the rotary shaft 8. Further, as the gear transmission mechanism (gear train) from the rotating weight 10 fixed to the shaft 9 to the rotary shaft 8, a gear 15 fixed to the shaft 9 and the gear 14 fixed to the rotary shaft 8 are provided. Here, the "gear train" indicates the gears 15 and 14. In this case, if rotation of the rotating weight 10 is increased in speed and the rotary shaft 8 is made to rotate, the electrically charged films (electret films) 3 provided at the rotating member can be made to rotate faster with respect to the counter electrodes 2 at a stop at the counter board 1 (fixed to bridge 34). Therefore, if the rotational speed of the rotating member 4 increases, the amount of power generation can be raised. Note that, the gear train is not limited to two gears. Three or more gears may also be combined. Further, a gear train having special gears, cams, links, one-directional clutches, etc. interposed in the middle is also included in the "gear transmission mechanism" here. The shaft 9 here is supported at the bridge 34 through a bearing 16. The shaft 9 may also be supported by support by the main plate 33 and the bridge 34.

As the gear transmission mechanism from the rotating weight 10 fixed to the shaft 9 to the rotary shaft 8, it is possible to apply the rotation drive technology of self-winding systems known up to now in mechanical type wristwatches. For example, it is also possible to convert the forward and reverse direction rotations of a rotating weight 10 fixed to a shaft 9 due to arm movement or other vibration to constant single-direction rotation by a conversion clutch mechanism provided inside the gear transmission mechanism.

Such a conversion clutch mechanism is well known as a two-way clutch mechanism in the known arts of mechanical type self-winding wristwatches, so these known arts etc. can be applied. Further, it is also possible to transmit only one direction of the forward and reverse direction rotation or swinging of the shaft 9 due to the rotating weight 10 to the rotary shaft 8 by a one-way clutch. In this case, even when the shaft 9 of the rotating weight 10 (rotary shaft 8 of rotating member 4) is rotating in the reverse direction, there is no longer a force obstructing the movement applied to the rotating member 4, so there is no longer a waste of kinetic energy and the efficiency of power generation can be raised. The gear transmission mechanism of the rotating member 4 and rotating weight 10 explained above can be suitably used in the embodiments explained below as well. In the present embodiment, the rotating weight 10 can also be directly provided at the rotary shaft 8. Furthermore, a weight may be provided at the rotating member 4 and used instead of the rotating weight. In these cases, the gear transmission mechanisms 15 and 14 are unnecessary.

Next, details of the present embodiment will be explained below. For the electret material used as the electrically charged films in the present invention, a material able to easily carry a charge is used. For example, as a material carrying a minus charge, a silicon oxide ($SiO_2$), a fluororesin material, etc. is used. Specifically, as one example, as a minus charged material, there is the fluororesin material made by Asahi Glass called CYTOP® (perfluorinated polymer).

Furthermore, in addition, as the electret material, there are polymer materials such as polypropylene (PP), polyethylene terephthalate (PET), polyvinyl chloride (PVC), polystyrene (PS), polytetrafluoroethylene (PTFE), polyvinylidene difluoride (PVDF), polyvinyl fluoride (PVF), etc. As an inorganic material, the above-mentioned silicon oxide ($SiO_2$) or silicon nitride (SiN) etc. can also be used. In addition, a known electrically charged film can be used.

Figure 7:
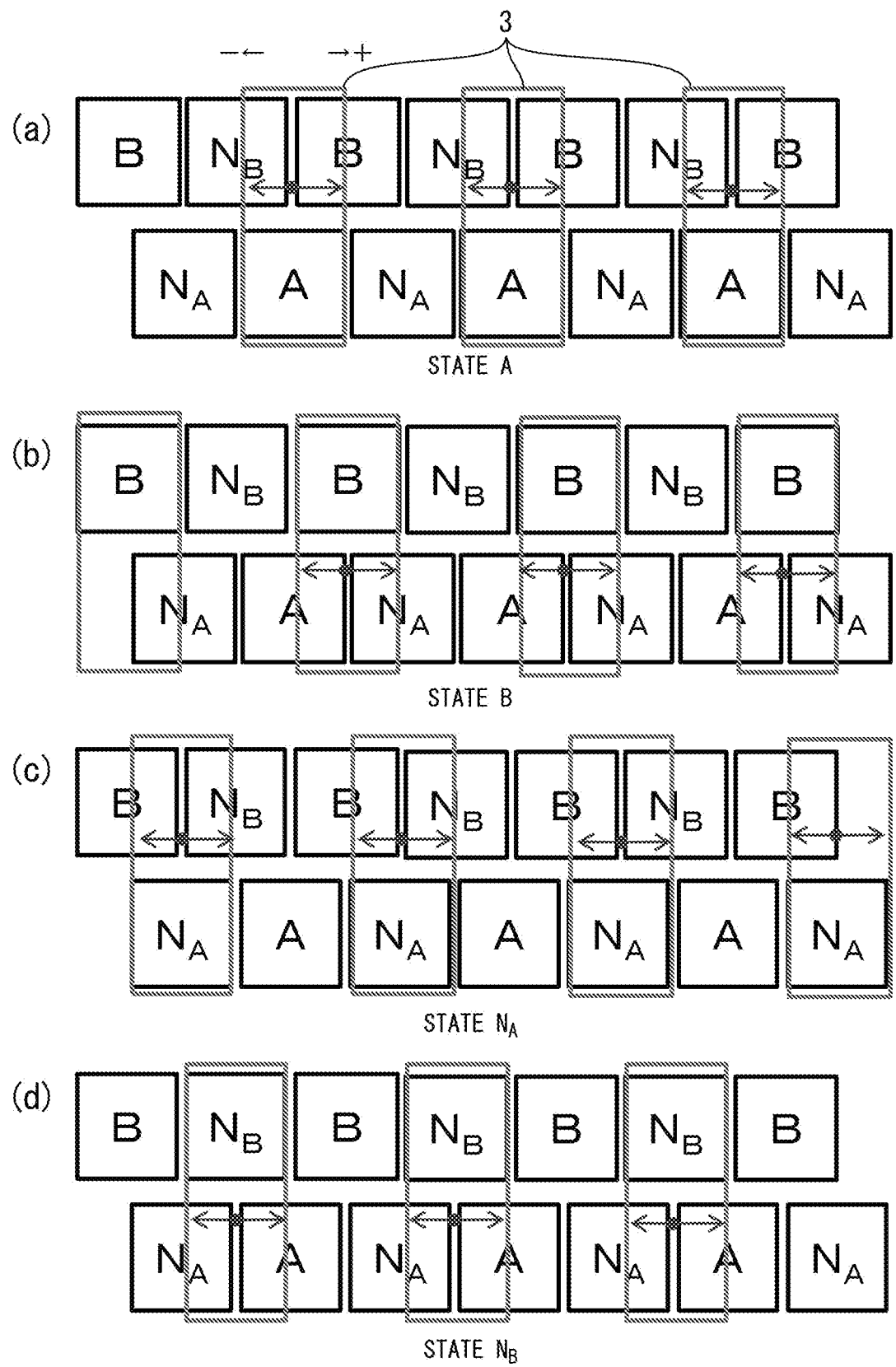
FIGS. 7(a) to (d) are explanatory views explaining the Coulomb forces acting on the areas of overlapping parts of the electrically charged films 3 and the electrodes A, NA, B, and NB in the first embodiment of the present invention. Note that, the electrically charged films 3 and the electrodes A, NA, B, and NB are all drawn schematically as rectangular shapes. They are intentionally made rectangular shapes to facilitate understanding, but are fan-shaped in the first embodiment.

Referring to FIGS. 5 to 7, power generation by the electrically charged films 3 and counter electrodes 2 will be explained. The framework of power generation of the present embodiment is the same as the type of FIG. 18 explained in PLT 1. The electrically charged films 3 of the bottom surface of the rotating member 4, as shown in FIG. 5(a), are respectively formed in radial shapes. Between the radial shaped pieces, blank parts are formed. There is no input from the rotating electrically charged films 3 to the rectifier. In the present embodiment, there are two lines of electrodes: the outer circumference line of electrodes of the first electrodes A and the second electrodes NA at the outer circumference side and the inner circumference line of electrodes of the first electrodes B and the second electrodes NB at the inner circumference side. Dividing the counter electrodes into such a plurality of lines of first electrodes and second electrodes will be referred to here as "multiphasing".

At the outer circumference line of electrodes of the first electrodes A and second electrodes NA at the outer circumference side, current is generated in the following way. The interconnect connecting the plurality of first electrodes A will be referred to as the "A interconnect", while the interconnect connecting the plurality of second electrodes NA will be referred to as the "NA interconnect". The first electrodes A and the second electrodes NA are alternately arranged in the direction of movement (here, the rotational direction) at constant intervals (here, certain angular interval) in a single line.

At a first electrode A of FIG. 5(b), an electrically charged film 3 shown by the broken lines overlaps. The time period during which the electrically charged film 3 overlaps the first electrode A will be referred to as the "A time period". The electrically charged film 3 (electret film) holds a negative charge, so at the first electrode A, a positive charge is attracted due to electrostatic induction. When a positive charge is attracted, a current flows.

On the other hand, along with rotation of the rotating member 4 (provisionally assumed to be clockwise), the electrically charged film 3 shown by the broken line overlaps the adjoining second electrode NA. The time period during which the electrically charged film 3 overlaps the second electrode NA will be referred to as the "NA time period". At the second electrode NA, a positive charge is attracted due to electrostatic induction. When a positive charge is attracted, a current flows. As opposed to this, at the first electrode A, a blank part (hole) is overlapped, so the positive charge attracted in the A time period dissipates and a reverse direction current flows. Along with rotation of the rotating member 4, the A time period and the NA time period are alternately repeated. That is, at the A time period, current flows from the second electrode NA to the first electrode A, while at the NA time period, current flows from the first electrode A to the second electrode NA.

At the inner circumference line of electrodes of the first electrodes B and the second electrodes NB at the inner circumference side, current is generated in the following way. The interconnect connecting the plurality of first electrodes B will be referred to as the "B interconnect", while the interconnect connecting the plurality of second electrodes NB will be referred to as the "NB interconnect". In the same way as the first electrodes A and the second electrodes NA, the inner circumference side first electrodes B and second electrodes NB are alternately arranged along the rotational direction at certain angular intervals in a line. The inner circumference side first electrodes B and second electrodes NB are arranged by a phase difference of exactly one-quarter cycle from the outer circumference side first electrodes A and second electrodes NA. At the inner circumference side first electrodes B and second electrodes NB, like the outer circumference side first electrodes A and second electrodes NA, alternating currents flow by a delay of a phase difference of exactly one-quarter cycle. The alternating current generated at the outer circumference line of electrodes of the first electrodes A and second electrodes NA at the outer circumference side runs through the interconnects A and NA to be input to the rectifying circuit 20, while the alternating current generated at the inner circumference line of electrodes of the first electrodes B and the second electrodes NB at the inner circumference side runs through the interconnects B and NB to be input to the rectifying circuit 20. These are rectified and taken out as DC current shown in FIG. 6. Here, in FIG. 6, the abscissa indicates the phase angle of the alternating current generated at the electrodes, while the ordinate indicates the amplitude of the alternating current generated. As explained above, the phase of the alternating current is replaced with the displacement angle. The two-phase alternating current waveform output from the power generation system explained above is converted by the rectifying circuit 20 to direct current which is then run through the step-down circuit 30 and charged into the secondary cell 22. If the counter electrodes 2 are provided at the rotating member 4, it is not possible to provide interconnects from the counter electrodes 2 for input to the rectifying circuit 20, so it is only possible to connect the counter electrodes 2 and rotary shaft 8 and take out power generation current from the rotary shaft 8. The resistance of the power transmission route increases and the power generation efficiency ends up being lowered. However, according to the configuration of the present embodiment, it is sufficient to take out current from the counter electrodes 2 of the fixed counter board, so the circuit configuration can be made extremely simple.

If the rotating weight 10 causes the rotating member 4 fixed to the rotary shaft 8 to rotate, the electrically charged films (electret films) 3 and the first electrodes A, second electrodes NA, first electrodes B, and second electrodes NB of the counter electrodes 2 will change in overlapping areas. The positive charges attracted at these will change and alternating currents shown in FIG. 6 will be generated between the electrically charged films (electret films) 3 and the counter electrodes 2. These will be output to the quartz movement through the output parts such as the rectifying circuit 20, step-down circuit, etc. The rectifying circuit 20 is a bridge type which is provided with four diodes for a single-phase alternating current waveform. In the present embodiment, the waveform is a two-phase alternating current one, so eight diodes are provided.

Figure 8:
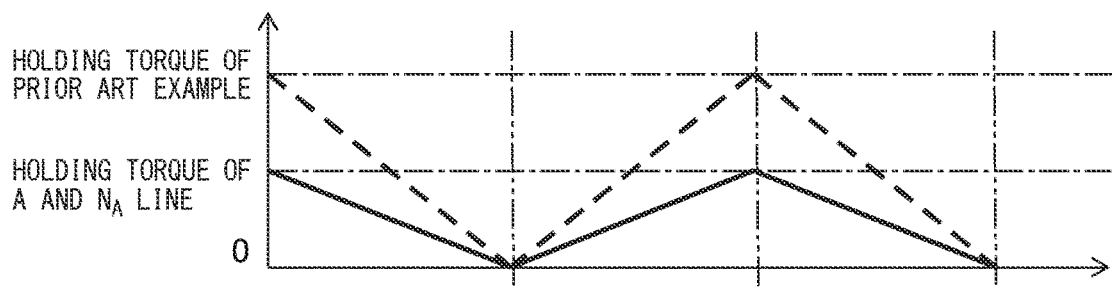
FIGS. 8(a) to (c) are explanatory views showing the holding torques acting on the top line and bottom line of FIG. 7 and the holding torque acting on the rotating member as a whole.
Figure 8:
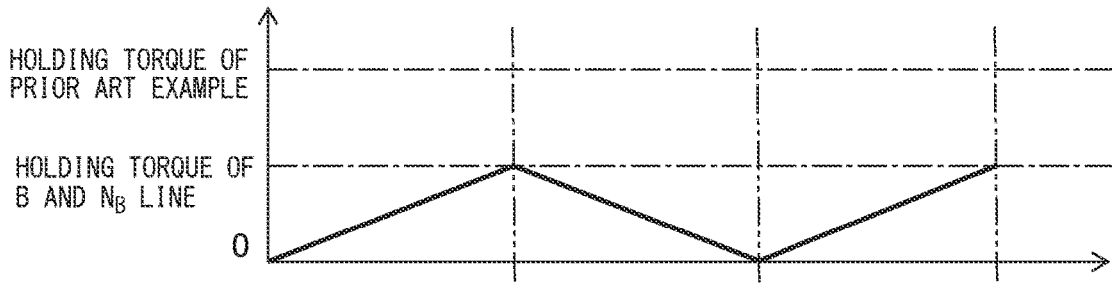
Figure 8:
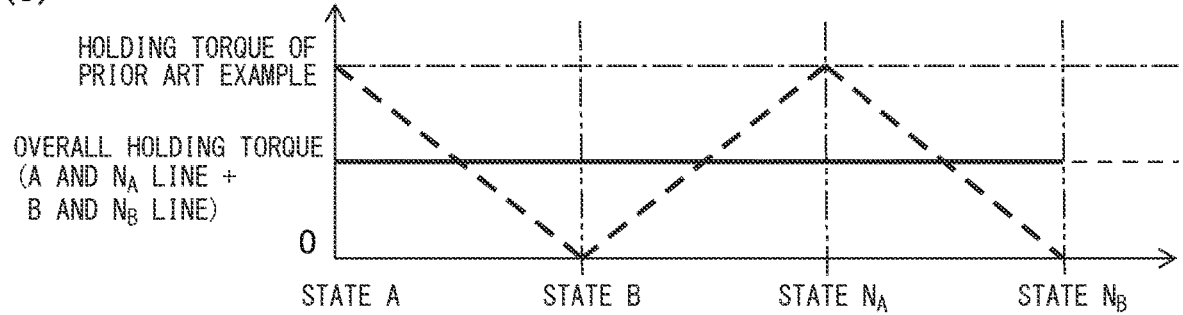
Figure 9:
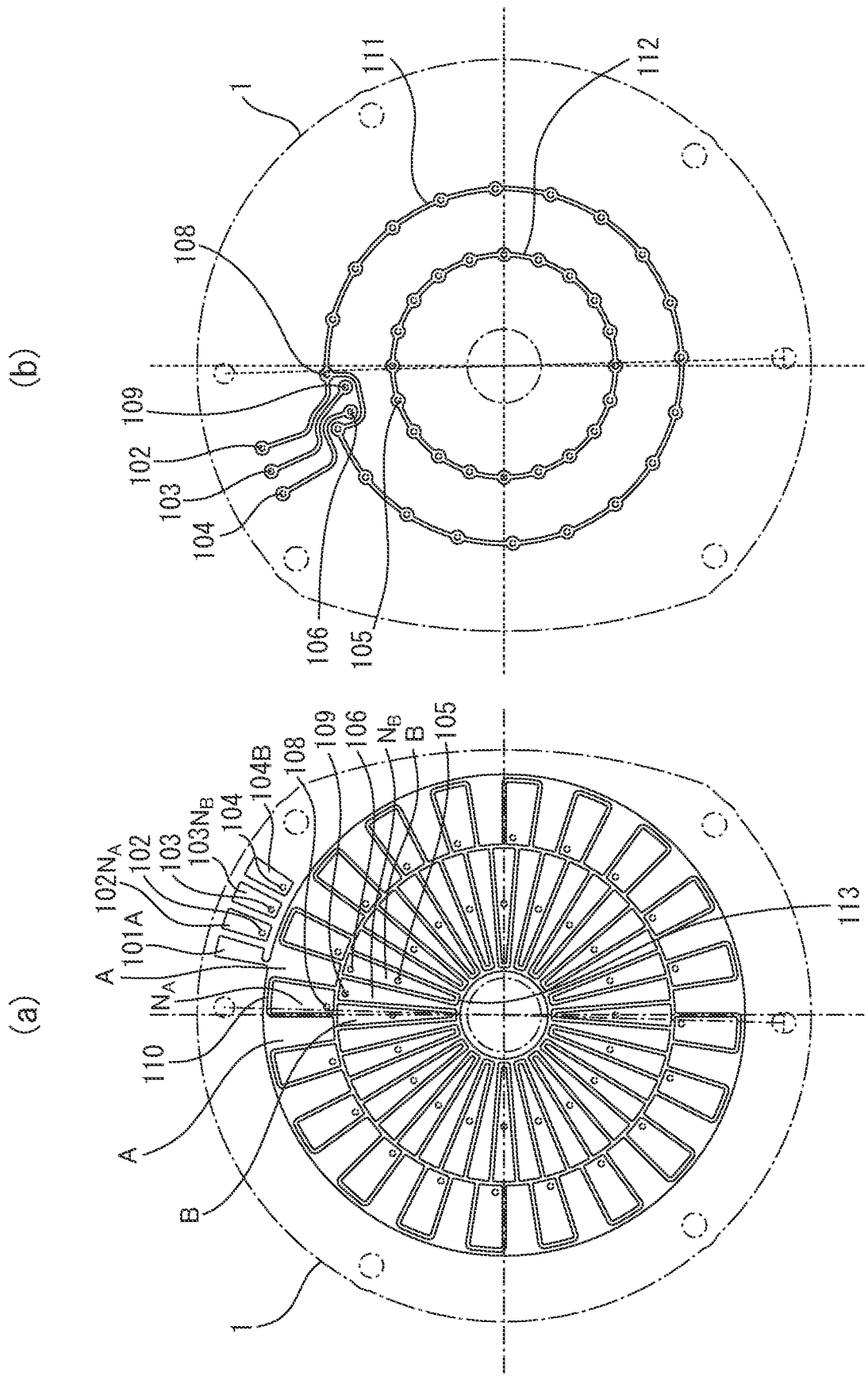
FIG. 9 are views of one example showing the electrical interconnect patterns of a front and back of a counter board in the first embodiment of the present invention. (a) shows the front side of the counter board. The first electrodes A and B and the second electrodes NA and NB are formed on only one surface of the counter board 1. (b) shows the back side of the counter board.

FIGS. 7(a) to (d) are explanatory views for explaining the Coulomb forces acting on areas of overlapping parts of the electrically charged films 3 and the electrodes A, NA, B, and NB in the first embodiment of the present invention. Note that, the electrically charged films 3 and the electrodes A, NA, B, and NB are all schematically illustrated as rectangular shapes. They are intentionally made rectangular shapes to facilitate understanding, but are fan shaped in the first embodiment. FIG. 8 is an explanatory view showing the holding torques acting on the top line and bottom line in FIG. 7 and the holding torque acting on the rotating member as a whole. FIG. 9 shows one example of the electrical interconnect patterns at the front and back of the counter board of the first embodiment of the present invention. FIG. 9(a) shows the front side of the counter board 1. The first electrodes A and B and second electrodes NA and NB are formed on only one side of the counter board 1. FIG. 9(b) shows the back side of the counter board 1.

In the present embodiment, as shown in FIG. 5(b), the inner circumference side first electrodes B and second electrodes NB are arranged with a phase difference of exactly one-quarter of a cycle from the outer circumference side first electrodes A and second electrodes NA. A specific example of arrangement of the first electrodes A, B and second electrodes NA, NB of the counter electrodes 2 at the counter board 1 is shown in FIGS. 9. This embodiment will be explained in brief. If making the counter electrodes multiphased, it is necessary to arrange the electrodes separated independently and loss of area ends up occurring due to the separation. In the following embodiment, this area loss is reduced as much as possible by modifying the embodiment.

As shown in FIG. 9(a), reference numeral 101A indicates a takeout terminal after connection of all of the first electrodes A. Reference numeral 102NA indicates a takeout terminal after connection of all of the second electrodes NA. Reference numeral 103NB indicates a takeout terminal after connection of all of the second electrodes NB. Reference numeral 104B indicates a takeout terminal after connection of all of the first electrodes B.

In the embodiment shown in FIGS. 9(a) and (b), the layout for connecting the electrodes is as follows: The first electrodes A are arranged at the outer circumference side of the counter board 1 and are provided alternately with the second electrodes NA. The first electrodes A are connected by linkage by the outermost peripheral parts 110 of the electrical interconnect patterns. On the other hand, the first electrodes B are arranged at the inner circumference side of the counter board 1 and are provided alternately with the second electrodes NB. The second electrodes NB are connected by linkage by the innermost peripheral parts 113 of the electrical interconnect patterns. As opposed to this, at the front side of the counter board, it is also possible to provide two concentric circles of connection patterns linking and connecting the second electrodes NA with each other and the first electrodes B with each other, but the areas of the electrodes end up being narrowed by the amounts of provision of the two connection patterns. To make the electrodes equal in areas and enlarge them to the maximum extent, as shown in FIG. 9(b), the second electrodes NA and first electrodes B on the front side of the counter board 1 are connected through thru holes to ring-shaped connection patterns 111 and 112 formed at the back side.

The first electrodes A are connected with a takeout terminal 101A from the outermost peripheral parts 110 of the patterns. The second electrodes NA are connected with a connection pattern 111 through thru holes 108 provided in the same and are connected with a takeout terminal 102NA from a thru hole 102. The first electrodes B are connected with a connection pattern 112 through thru holes 105 provided in the same and are connected with a takeout terminal 104B through thru holes 104 from a thru hole 106 provided at one of the first electrodes B. The second electrodes NB are linked with each other and connected to the innermost peripheral parts 113 of the patterns and are connected with a takeout terminal 103NB through thru holes 103 from a thru hole 109 provided at one of the second electrodes NB. If arranging the first electrodes A, second electrodes NA, first electrodes B, and second electrodes NB in such a pattern, it is possible to make the electrodes equal in areas and enlarge the areas of the electrodes to the maximum extent.

Below, the Coulomb forces acting on the areas of the overlapping parts of the electrically charged films 3 and electrodes A, NA, B, and NB in this arrangement will be explained. The areas of the outer circumference side first electrodes A and second electrodes NA and the areas of the inner circumference side first electrodes B and second electrodes NB may be made all the same areas.

When the electrically charged films engage in translational motion, they may be made rectangular shaped electrodes as is as shown in FIGS. 7. FIGS. 7(a) to (d) are schematic views of the films laid out in single straight lines along the direction of movement (rotation direction) when viewing FIG. 5(b) planarly from above. The top row consists of the inner circumference line of electrodes of the first electrodes B and the second electrodes NB at the inner circumference side, while the bottom row consists of the outer circumference line of electrodes of the first electrodes A and second electrodes NA at the outer circumference side.

FIG. 7(a) shows the time when the outer circumference side first electrodes A and the electrically charged films 3 perfectly overlap. That is, the areas of the overlapping parts of the first electrodes A and electrically charged films 3 become maximum. Therefore, if the electrically charged films 3 try to move in the plus direction of movement (rotation) illustrated, a holding torque is caused to act on the rotating member 4 to block this movement. At this time, at the inner circumference side first electrodes B and second electrodes NB, no holding torque acts on the rotating member 4.

Next, the electrically charged films 3 move in the plus direction. FIG. 7(b) shows the time when the inner circumference side first electrodes B and the electrically charged films 3 perfectly overlap. That is, the areas of the overlapping parts of the first electrodes B and electrically charged films 3 become maximum. Therefore, if the electrically charged films 3 try to move in the plus direction of movement (rotation) illustrated, a holding torque is caused to act on the rotating member 4 to block this movement. On the other hand, at the outer circumference side first electrodes A and second electrodes NA, no holding torque acts on the rotating member 4. The positions of the electrically charged films 3 with respect to the counter electrodes then changes as in FIG. 7(c) and FIG. 7(d) then FIGS. 7(a) to (d) are repeated.

The outer circumference side first electrodes A and electrically charged films 3 and the outer circumference side second electrodes NA and electrically charged films 3 have respectively half the overlapping areas, so the amounts of power generation also become half, but if totaling up the two generated powers of the outer and inner side, it is possible to obtain an amount of power equal to when the overlapping areas of the outer circumference side electrodes and electrically charged films 3 become maximum, so the overall amount of power generation never drops.

Figure 20:
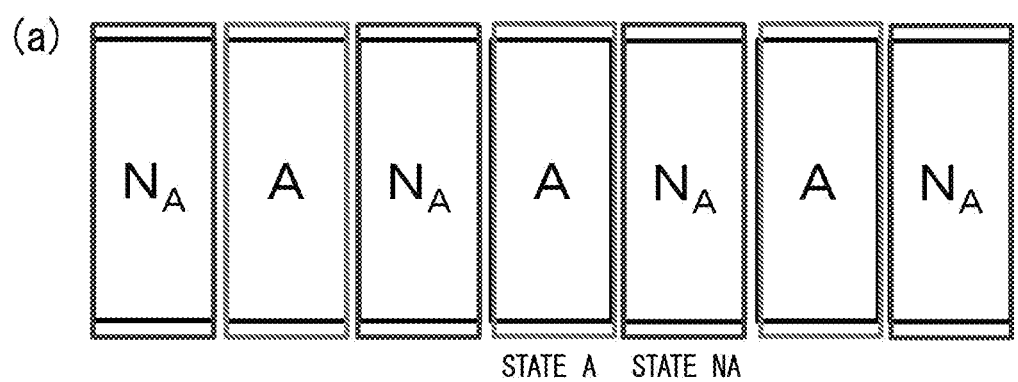
FIG. 20 are explanatory views explaining the Coulomb forces acting on the areas of overlapping parts of the electrically charged films 3 and the first electrodes A and second electrodes NA of the counter electrodes 2 of FIGS. 19.
Figure 20:
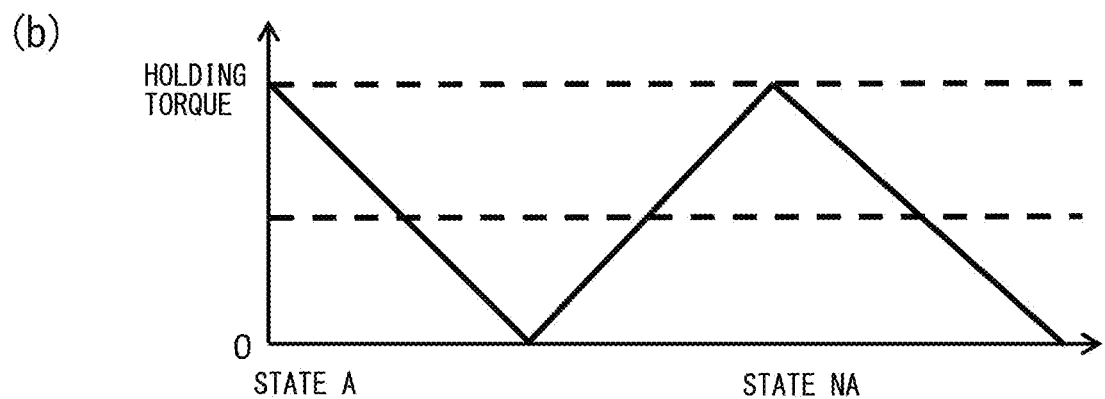

FIGS. 8(a), (b), and (c) show by graphs the holding torque of the outer circumference line of electrodes at the bottom row of FIG. 7, the holding torque of the inner circumference line of electrodes at the top row of FIG. 7, and the overall holding torque combining the two. In FIGS. 8, the ordinates show the intensity of the holding force when the Coulomb forces of attraction of the electrodes and electrically charged films cause the rotating member to be held in its position, while the abscissas shows the positions of the electrically charged films with respect to the counter electrodes shown in FIGS. 7(a) to (d). The broken line waveform is the data of the holding torque in the conventional structure of FIG. 20(a), while the solid line is the data of the holding torque according to the present embodiment.

Due to the reason explained previously, half of the holding torque of the outer circumference line of electrodes or inner circumference line of electrodes is cancelled out, so compared with the conventional structure, halves of the holding torques are sufficient. Furthermore, the waveforms of the holding torques are offset by half periods between the outer circumference line of electrodes and the inner circumference line of electrodes, so if combining these holding torques, there are no longer peaks in the holding torques and the torques are flattened.

According to the present embodiment, the overall holding torque can be held at a constant value with no peak values, so it is possible to suppress fluctuations in speed at the time of low rotation of the rotating member and possible to suppress fluctuations in the power generation current. Furthermore, compared with the prior art of FIGS. 20, the areas of the parts where the electrodes and electrically charged films completely overlap become halved (Coulomb forces become halved) and the holding torques can be reduced to half. Therefore, the initial torque of the rotating member 4 also can be reduced to half that of the prior art. By arranging the first electrodes and second electrodes of the counter electrodes like in FIG. 5(b), it is possible to maintain the generated power while reducing the Coulomb forces. Furthermore, it is possible to generate power by electret power generation without being affected by the Coulomb forces.

The present embodiment, as explained above, arranges the outer circumference line of electrodes and the inner circumference line of electrodes on the fixed board offset by half of the electrode widths (with phase difference of one-quarter cycle) so halves and flattens the holding torque and has one of the advantages shown next.

(1) Coulomb forces cancelled out can be made the same.

In the dual top and bottom surface type of the prior art (PLTs 4 and 5), if trying to cancel out the Coulomb forces, the top and bottom lines of electrically charged films had to be strictly adjusted in position so as to be offset in phase. There are two methods of forming lines of electrically charged films on the top and bottom surfaces of a board: either to form a line of electrically charged films on the top surface of one board, then turn the board over and form a line of electrically charged films on the other surface, or to form lines of electrically charged films on single surfaces of two boards and join the boards at their back surfaces. With either of the above methods of production, setting the bottom surface side line of electrically charged films precisely offset in phase difference from the top surface side line of electrically charged films is accompanied with considerable difficulty, so leads to an increase in the number of work hours and a rise in costs. Furthermore, in the dual top and bottom surface type, the counter electrodes of the top part and bottom part also have to be arranged offset by exactly predetermined amounts from each other. Adjustment of the positions of arrangement in such a three demensional power generation structure is accompanied with considerable difficulty. On the other hand, according to the present embodiment, the phase relationship is determined by the planar distance of arrangement on a board, so no adjustment is required. Due to this, the productivity is improved and the precision of cancellation of Coulomb forces is greatly improved.

(2) No problem with variation in amounts of electric charges of top and bottom electrically charged films.

In the dual top and bottom surface type of the prior art, when the amounts of electric charges of top surface electrically charged films and bottom surface electrically charged films are equal, the Coulomb forces can be cancelled out. However, in the dual top and bottom surface type, no matter which of the methods of production of the method of forming electrically charged films on the top and bottom surfaces of a single board, or the method of joining two boards is used, two electrically charged film forming operations and charging operations become necessary. In the electrically charged film forming step, the stickiness of the film material easily causes uneven film thickness. The amount of electric charge changes depending on the thickness of the electrically charged film. Further, in the charging step, since corona discharge is used to inject charges, uneven charging easily occurs. With each of the above operations, the amount of electric charges of the electrically charged films will vary. Therefore, in the dual top and bottom surface type, making the amounts of electric charges of the top and bottom electrically charged films equal was a considerably difficult problem. As opposed to this, according to the present embodiment, even if the thicknesses of the electrically charged films and amounts of electric charge vary among the individually produced specimens, it is possible to make them the same viewed from the single board and possible to cancel out the Coulomb forces. By doing this, it is possible to eliminate the problem in the dual top and bottom surface type of the prior art.

(3) Interconnects only required on one board.

That is, in the dual top and bottom surface type of the prior art, generated current is input and stored in the same rectifying circuit part from power generation electrodes arranged separated at the top and bottom parts of the housing. The rectifying circuit part is arranged at either the top part or the bottom part, so either of the interconnects from the top and bottom power generation electrodes or both of the interconnects have to become longer in length. Therefore, the interconnect resistance becomes larger and the stored power ends up being reduced. According to the present embodiment, the interconnects can be concentrated at one of the boards, so the rectifying circuit part can be placed near it and short interconnects can be used to transmit power.

(4) Superior cost wise.

In the dual top and bottom surface type of the prior art, electrically charged films and counter electrodes were required at both the top and bottom surfaces of the board, so operations for forming the electrically charged films and counter electrodes had to be performed twice. According to the present embodiment, one each is enough. Further, when forming electrically charged films at both surfaces of a rotating member, fixtures for fastening the rotating member at the front and back and work for the same are required. In the present embodiment, such costs can be slashed.

(5) Ability to be configured thin.

In the dual top and bottom surface type of the prior art, the top and bottom surfaces of the moving board are provided with electrically charged films and electrodes have to be provided at both the top part and bottom part of the housing, so the generator ends up becoming thick and is unsuited for a wristwatch. According to the present embodiment, electrodes at the top surface of the board and electrically charged films of the rotating member are enough, so the generator can be configured thin.

Second Embodiment

Figure 10:
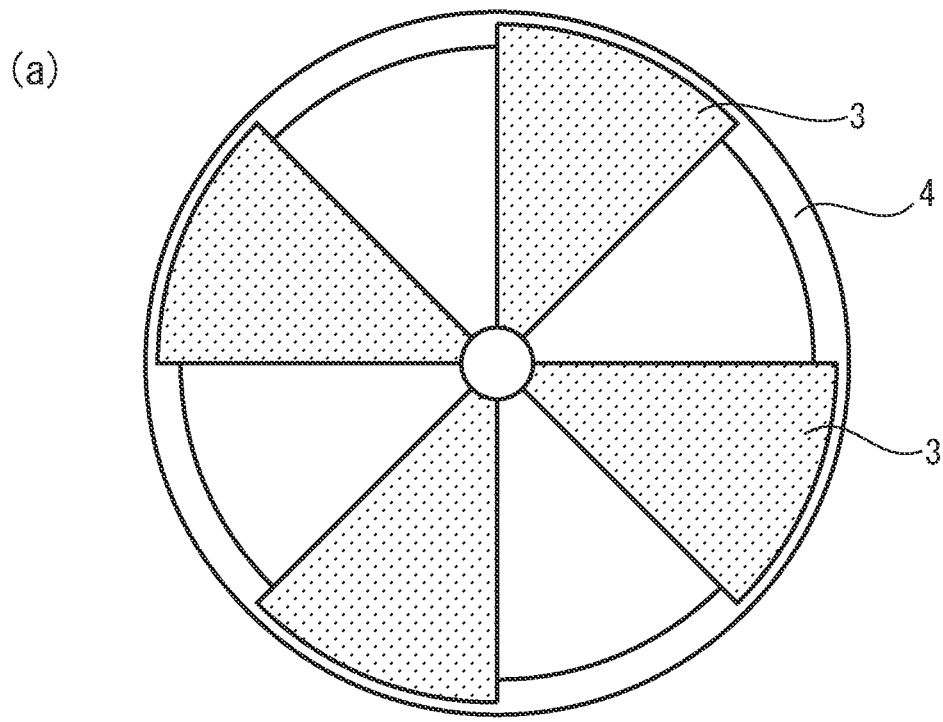
FIGS. 10(a) and (b) are views showing outlines of the counter electrodes and electrically charged films of the second embodiment of the present invention.
Figure 10:
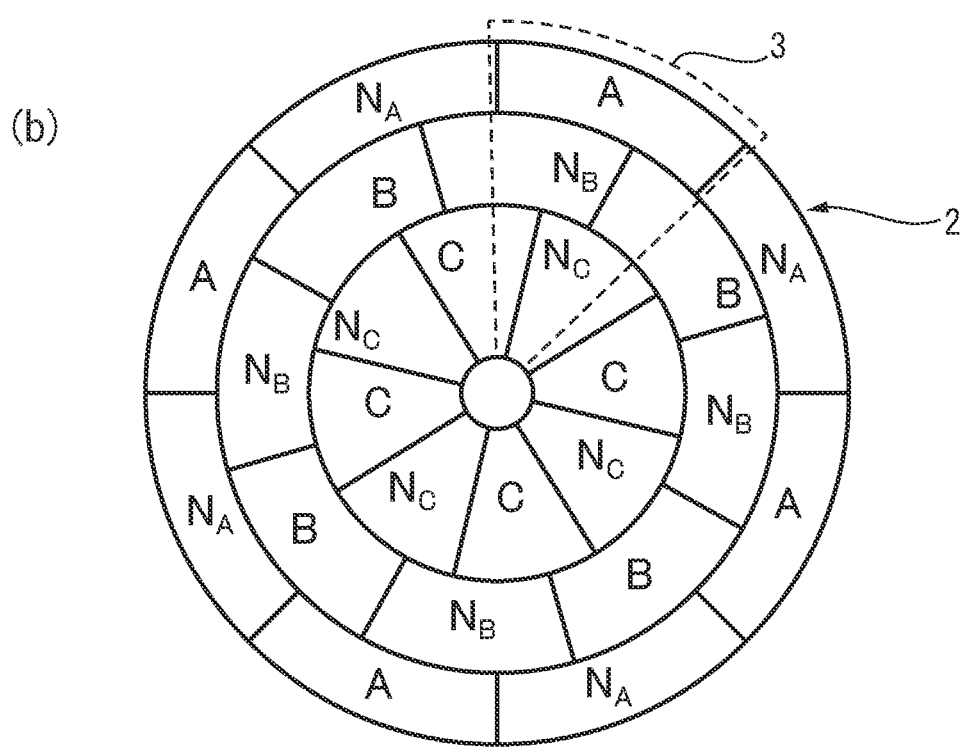
Figure 11:
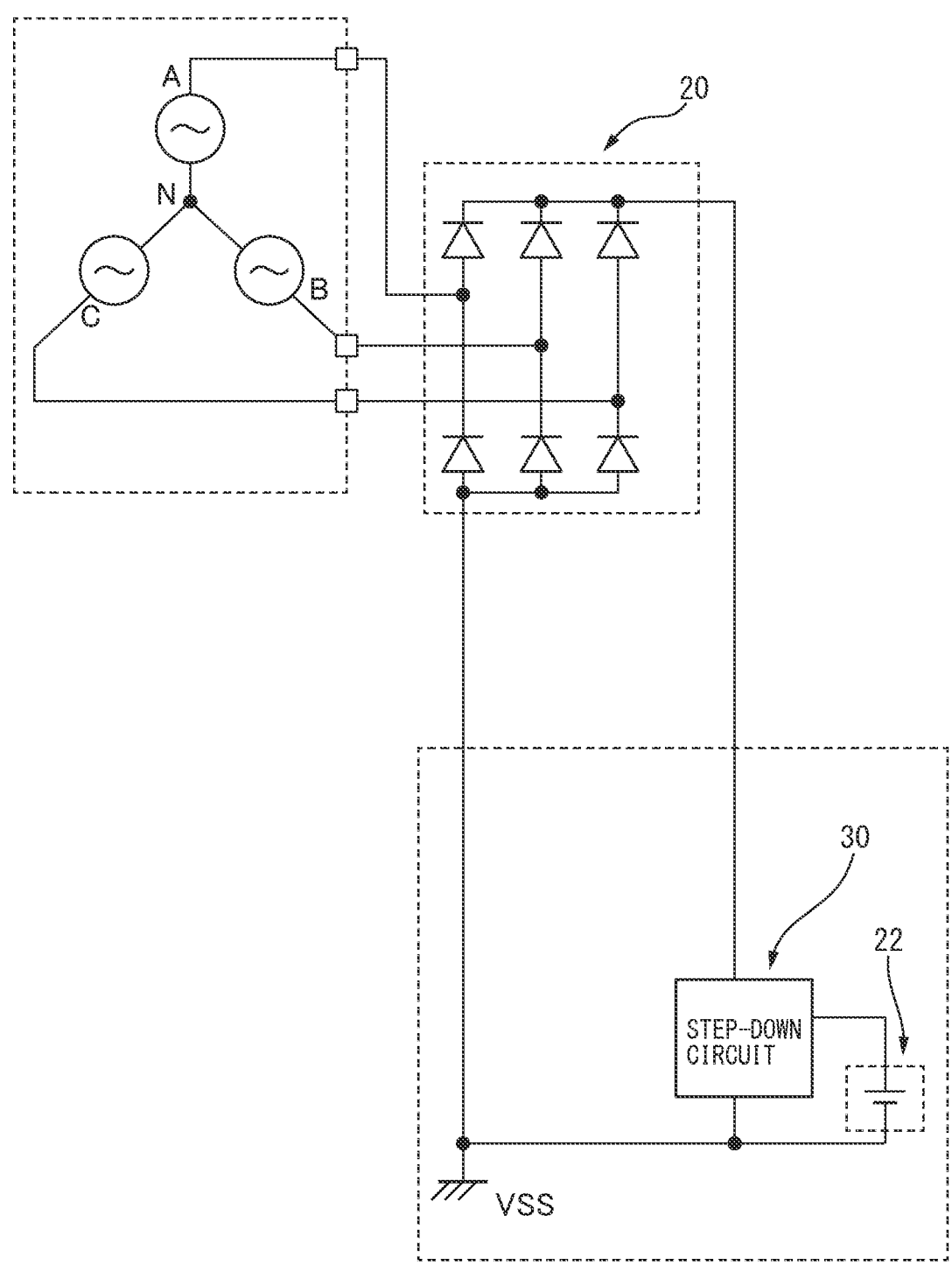
FIG. 11 is an explanatory view showing a rectifying circuit of the second embodiment of the present invention.
Figure 12:
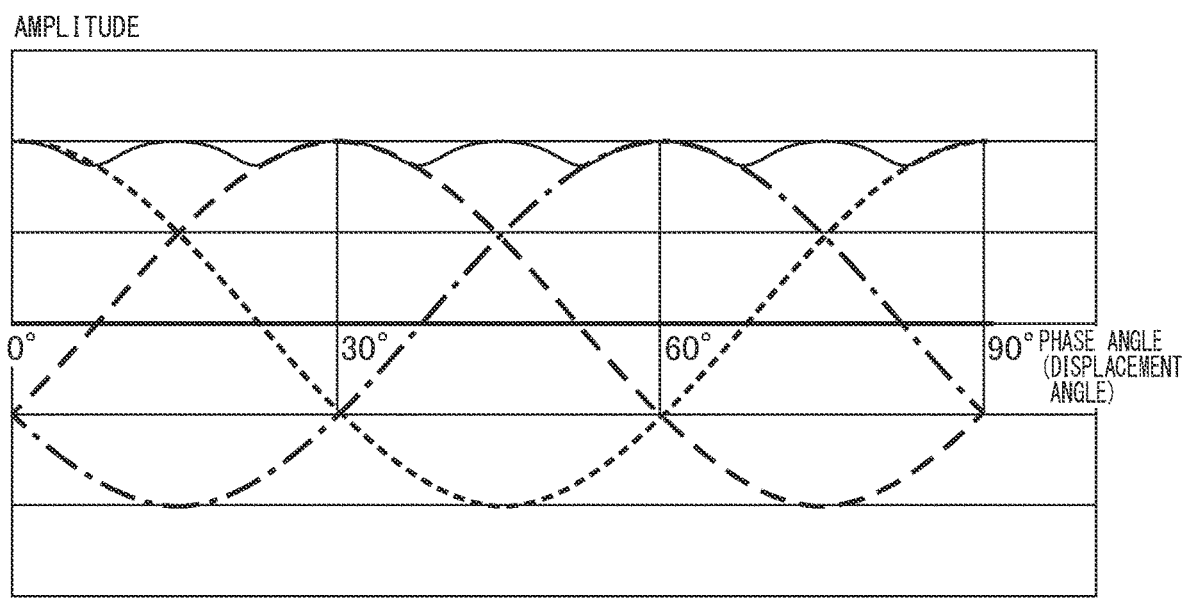
FIG. 12 is a graph showing the output from the rectifying circuit of the second embodiment of the present invention.

FIG. 10 is a view showing outlines of the counter electrodes and electrically charged films of the second embodiment of the present invention. FIG. 11 is an explanatory view showing a rectifying circuit of the second embodiment of the present invention. FIG. 12 is a graph showing the output from the rectifying circuit of the second embodiment of the present invention.

The second embodiment is an embodiment in which first and second electrodes are arranged so that the current of electrostatic induction power generation caused between the electrically charged films 3 and the counter electrodes 2 becomes a three-phase alternating current. The second embodiment also has the structure of FIG. 2 the same as the first embodiment. The point where it differs from the first embodiment is the point that the array of first and second electrodes provided at the counter board 1 is comprised of three lines from the outer circumference to the inner circumference in concentric circles (ring shapes) of an outer circumference line of electrodes, intermediate line of electrodes, and inner circumference line of electrodes. The second embodiment is an embodiment using a rotating member 4, but instead of the rotating member 4 of the second embodiment, the same effect is obtained even with a moving member engaged in translational motion. Note that the same is true in the other embodiments as well.

As shown in FIG. 10(*b*), at the outer circumference line of electrodes, the first electrodes A and the second electrodes NA are alternately arranged in the rotation direction at constant angular intervals in a single line. At the intermediate line of electrodes, the first electrodes B and the second electrodes NB are alternately arranged in the rotation direction at constant angular intervals in a single line. At the inner circumference line of electrodes, the first electrodes C and the second electrodes NC are alternately arranged in the rotation direction at constant angular intervals in a single line. In the embodiment of FIGS. 10(*a*) and (*b*), in the different lines, four each first and second electrodes are provided in the circumferential directions and four electrically charged films 3 are provided, but the invention is not limited to this. Any even number may be provided.

One cycle in the case of the embodiment of FIGS. 10(*a*) and (*b*) is 90°. Unlike in the first embodiment, assuming the rotating member 4 rotates in the counterclockwise direction, at the inner circumference line of electrodes, the first electrodes C and the second electrodes NC alternately repeat at positions advanced by 30° ahead from the outer circumference line of electrodes of the first electrodes A and the second electrodes NA, while at the intermediate line of electrodes, the first electrodes B and the second electrodes NB alternately repeat at positions advanced by 30° ahead from the inner circumference line of electrodes. The phase differences of the lines are not limited to the above illustration and may be suitably set so that a three-phase alternating current can be generated by the lines. All of the first electrodes and second electrodes are made equal in area, but the invention is not limited to this. The point is that the electrodes be arranged and the areas of the electrodes be set so that the holding torque of the rotating member 4 due to the Coulomb forces be reduced from the prior art.

The electrically charged films 3 of the bottom surface of the rotating member 4, as shown in FIG. 10(*a*), are respectively formed in radial shapes. Between the radial shaped pieces 3, blank parts are formed. Even if the blank parts directly face the counter electrodes, no charge is generated at the counter electrodes, so no current is generated. Note that, the electrically charged films 3 of the rotating member 4 may also rotate in the clockwise direction, but for the following explanation of FIGS. 13 to 15, they will be explained as rotating in the counterclockwise direction. In the present embodiment as well, the framework of generation of alternating currents at the first and second electrodes of the different lines is the same as in first embodiment. In the present embodiment, three-phase alternating current such as shown in FIG. 12 is generated. As a result, a Y-connection rectifying circuit 20 can be used to generate the DC voltage of the output waveform such as shown by the solid line of FIG. 12. In the case of a three-phase alternating current, it is possible to connect NA, NB, and NC to provide a virtual grounding point shown by N at FIG. 11, so an output line for grounding becomes unnecessary and the number of interconnects can be slashed. Therefore, compared with the first embodiment, it is possible to slash the diodes used in the rectifier 20 and simplify the circuit configuration. It is also possible to use a delta connection instead of a Y-connection for the generated three-phase alternating current.

Figure 13:
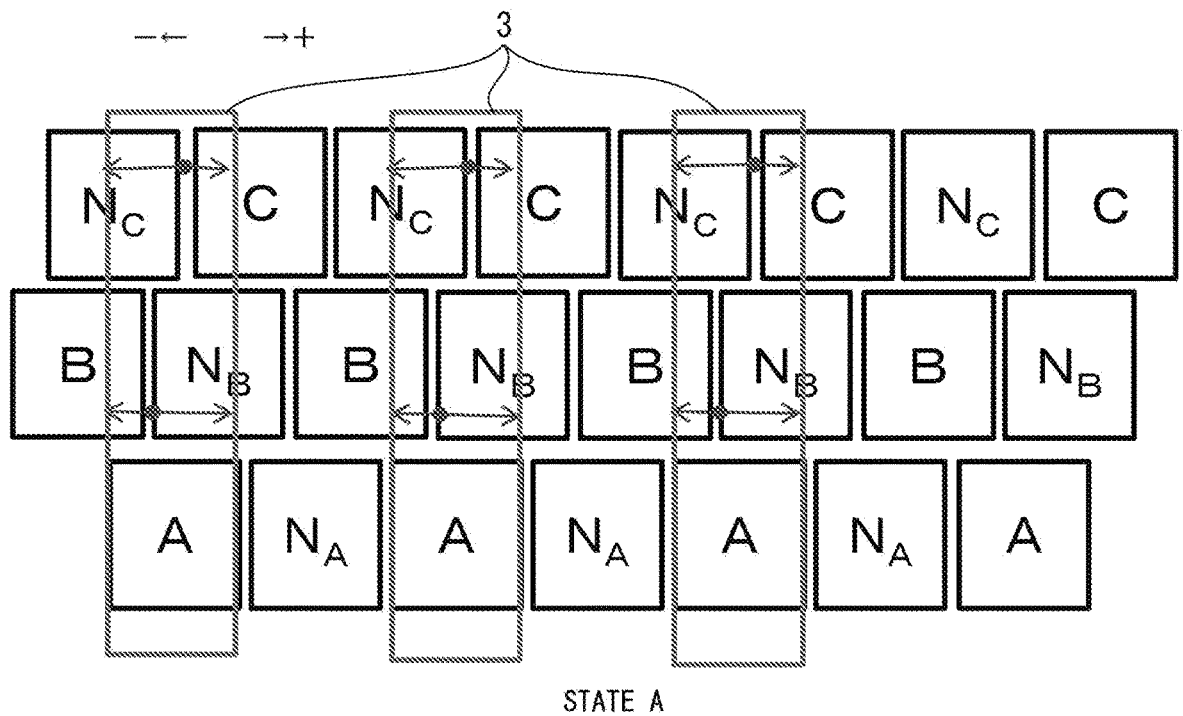
FIGS. 13(a) and (b) are explanatory views for explaining the Coulomb forces acting on the areas of overlapping parts of the electrically charged films 3 and the electrodes A, NA, B, NB, C, and NC in the second embodiment of the present invention.
Figure 13:
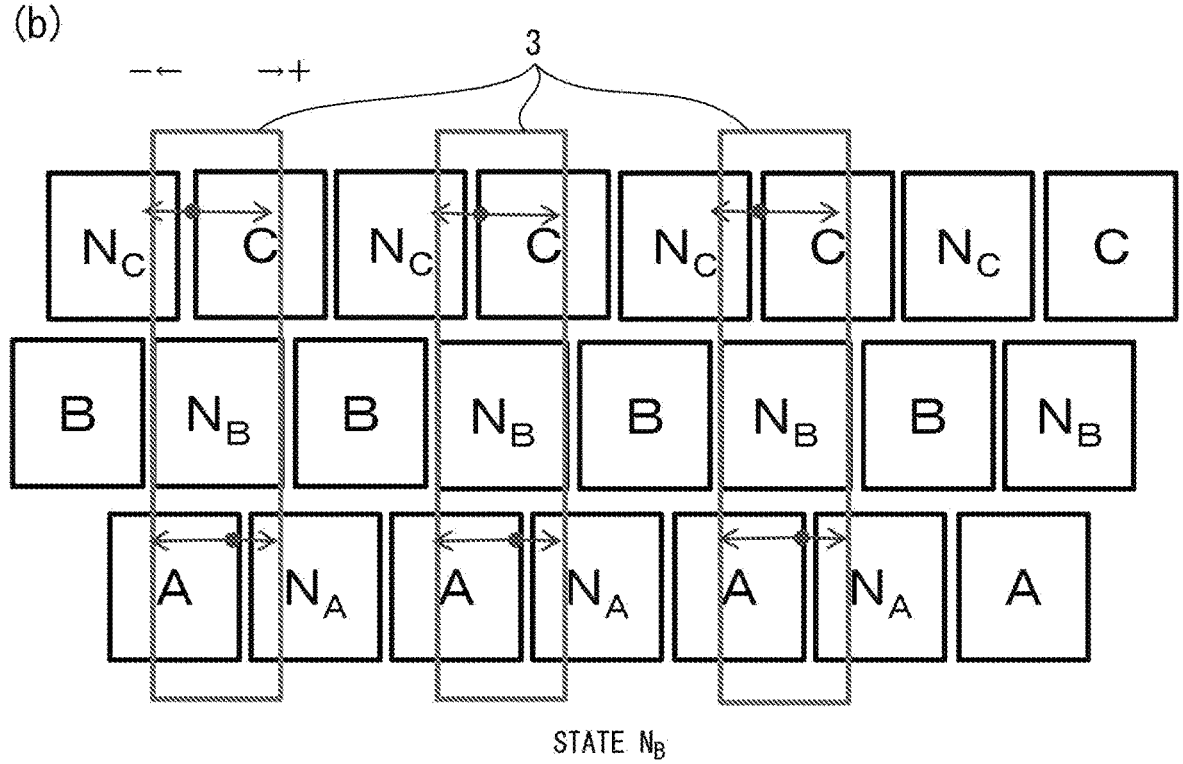
Figure 14:
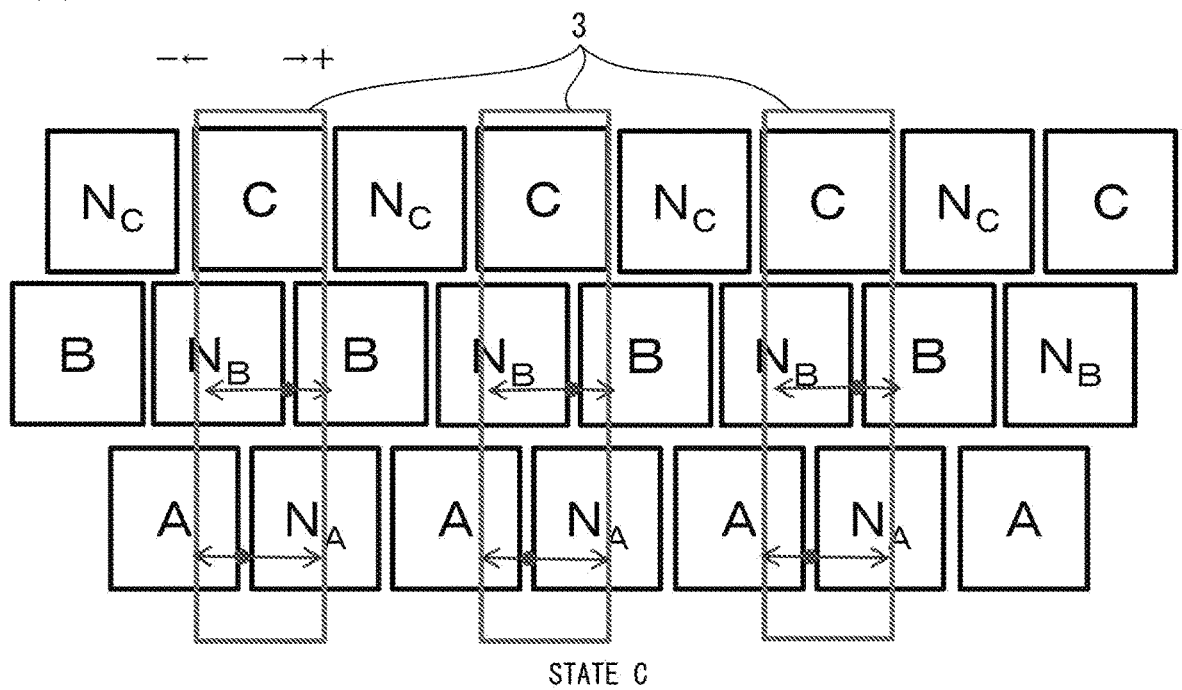
FIGS. 14(c) and (d) are explanatory views for explaining the Coulomb forces acting on the areas of overlapping parts of the electrically charged films 3 and the electrodes A, NA, B, NB, C, and NC in the second embodiment of the present invention.
Figure 14:
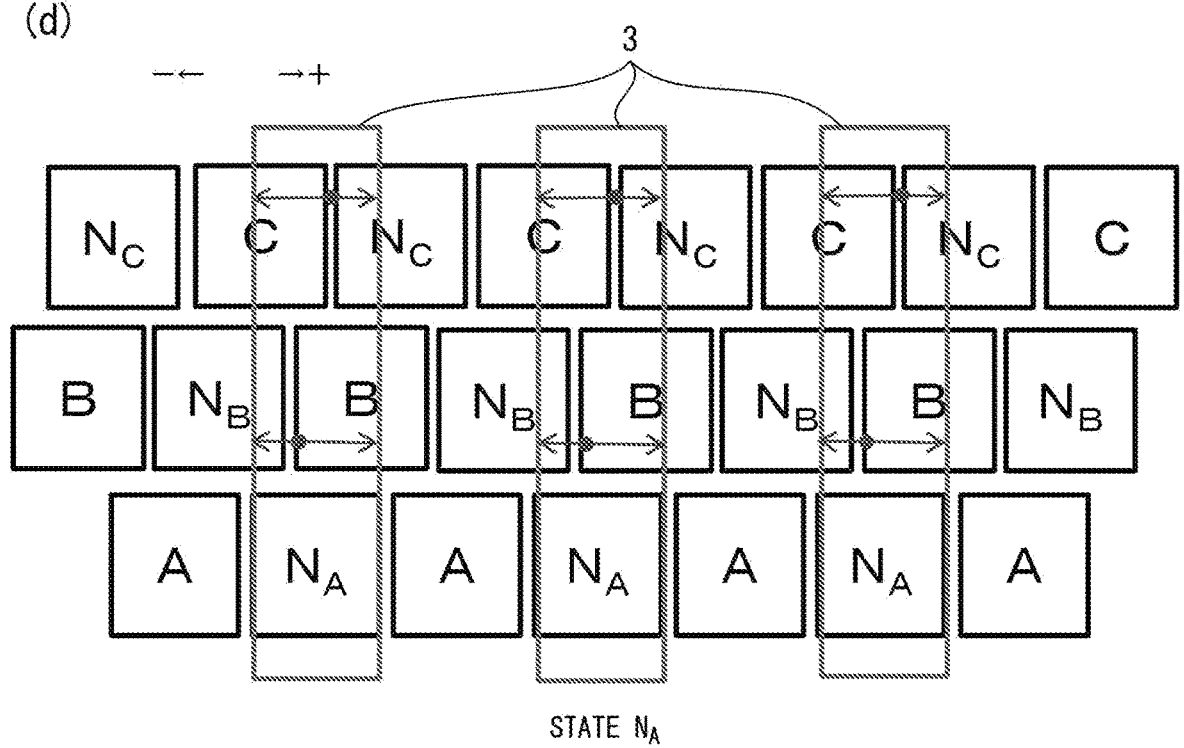
Figure 15:
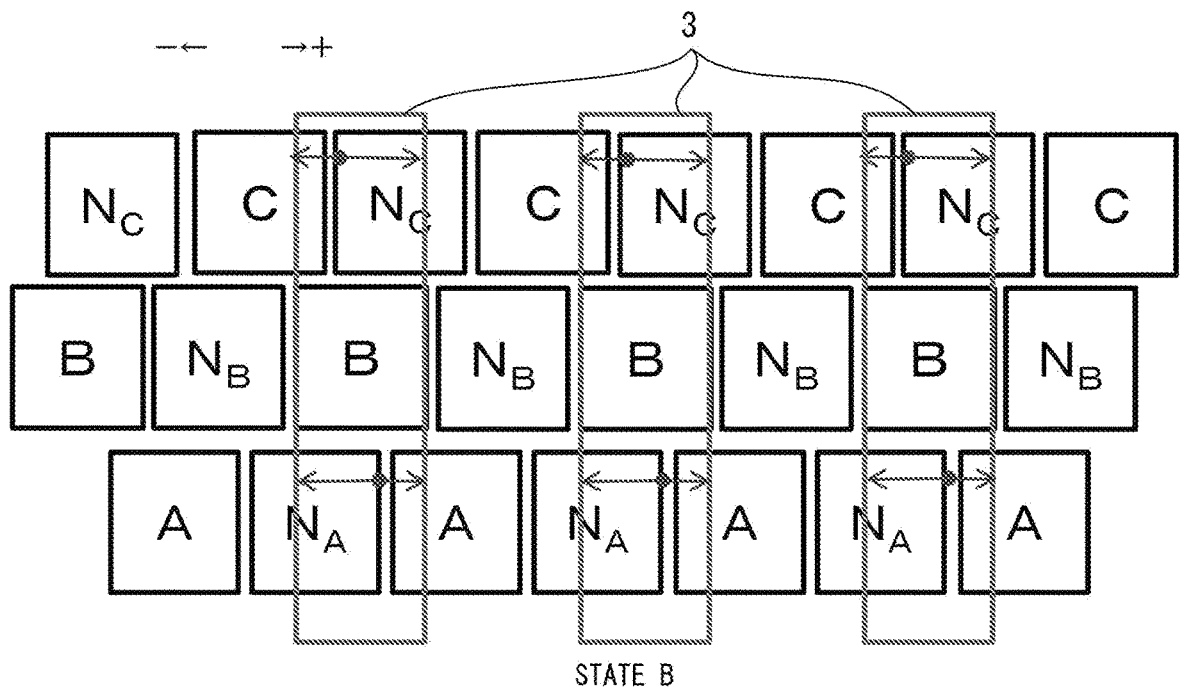
FIGS. 15(e) and (f) are explanatory views for explaining the Coulomb forces acting on the areas of overlapping parts of the electrically charged films 3 and the electrodes A, NA, B, NB, C, and NC in the second embodiment of the present invention.
Figure 15:
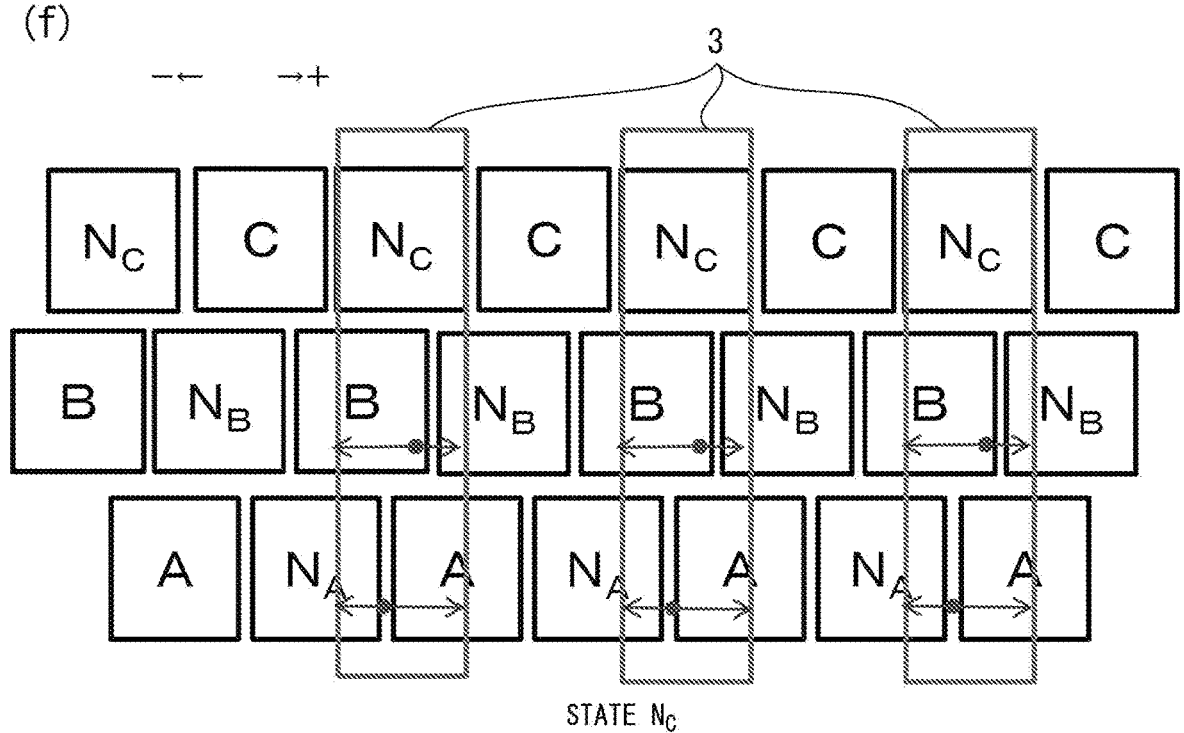
Figure 16:
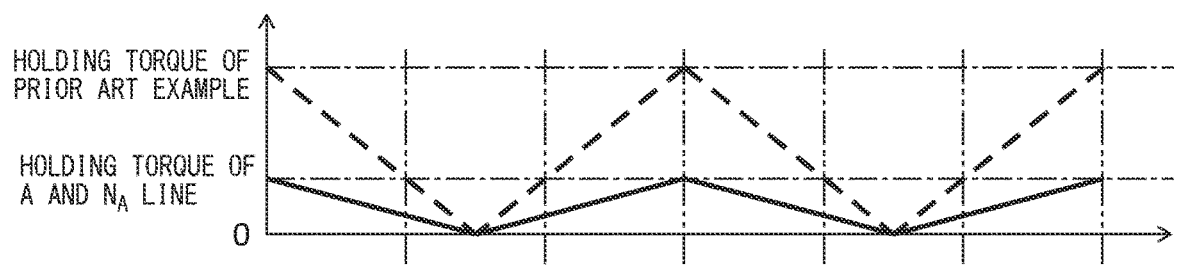
FIGS. 16(a) to (d) are explanatory views showing the holding torques acting on the outer circumference line, intermediate line, and inner circumference line of FIG. 10(b) and the holding torque acting on the rotating member as a whole.
Figure 16:
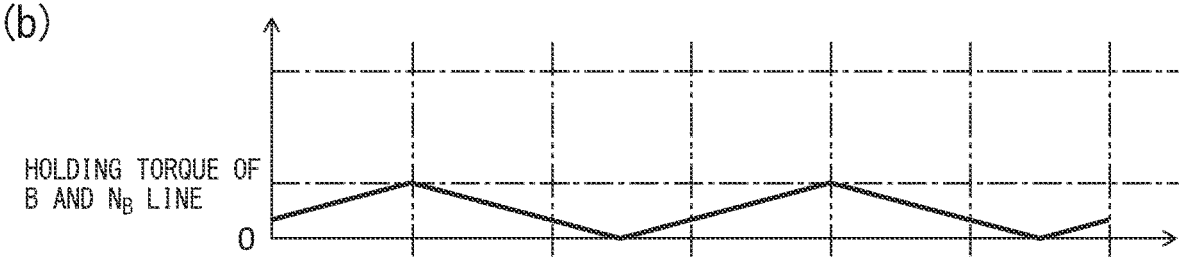
Figure 16:
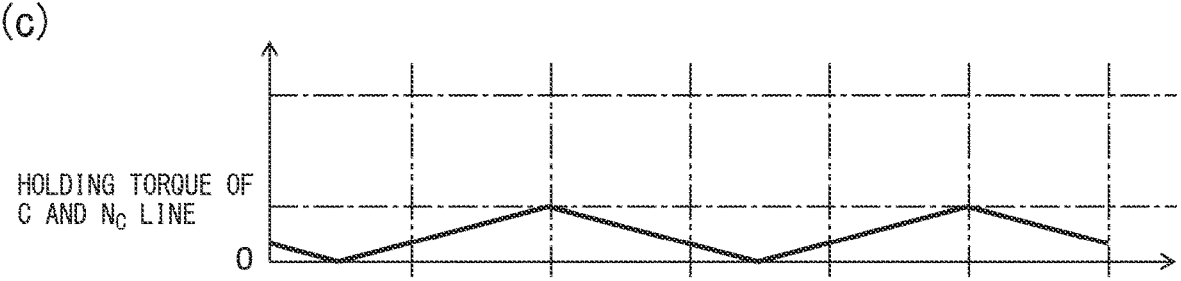
Figure 16:
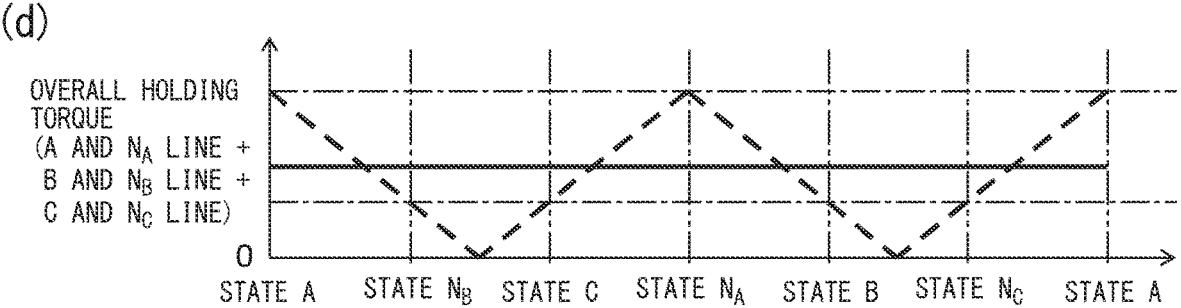

FIGS. 13(*a*) and (*b*), FIGS. 14(*c*) and (*d*), and FIGS. 15(*e*) and (*f*) are explanatory views for explaining the Coulomb forces acting on the areas of the overlapping parts of the electrically charged films 3 and the electrodes A, NA, B, NB, C, and NC in the second embodiment of the present invention. FIGS. 16(*a*), (*b*), (*c*), and (*d*) are explanatory views showing the holding torques acting on the outer circumference line, intermediate line, and inner circumference line of FIG. 10(*b*) and the holding torque acting on the rotating member as a whole. In FIGS. 16, the ordinates show the intensity of the holding force when the Coulomb forces of attraction of the electrodes and electrically charged films cause the rotating member to be held in its position, while the abscissas show the position of the electrically charged films with respect to the counter electrodes shown in FIGS. 13 to 15. The broken line waveform is the data of the holding torque in the conventional structure of FIG. 20(*a*), while the solid line is the data of the holding torque according to the present embodiment. The top row, middle row, and bottom row in FIGS. 13 to 15 respectively correspond to the inner circumference line, intermediate line, and outer circumference line of FIG. 10(*b*). In FIGS. 13 to 15, plus side movement of the electrically charged films 3 indicates rotation of the electrically charged films 3 of the rotating member 4 in FIGS. 10(*a*) and (*b*) in the counterclockwise direction.

FIG. 13(*a*) shows the time when the bottom row first electrodes A and electrically charged films 3 perfectly overlap. That is, the areas of the overlapping parts of the first electrodes A and the electrically charged films 3 become maximum. Therefore, if the electrically charged films 3 try to move in the illustrated plus direction of movement (rotate in counterclockwise direction), a holding torque acts at the rotating member 4 to stop that movement. At this time, the total holding torque of the medium row first electrodes B and second electrodes NB and the total holding torque of the top row second electrodes NC and first electrodes C somewhat act. The electrodes of the counter board are divided into three lines, so the result becomes just one-third of the originally acting holding torque in each line. The initial torque of the rotating member 4 can also be reduced from the prior art.

Next, the electrically charged films 3 move in the plus direction. FIG. 13(*b*) shows the time when the middle row second electrodes NB and electrically charged films 3 perfectly overlap. That is, the areas of the overlapping parts of the second electrodes NB and the electrically charged films 3 become maximum. Therefore, if the electrically charged films 3 try to move in the illustrated plus direction of movement (rotate), a holding torque acts at the rotating member 4 to stop that movement. At this time, the total holding torque of the bottom row first electrodes A and second electrodes NA and the total holding torque of the top row second electrodes NC and first electrodes C somewhat act. In this case as well, the electrodes of the counter board are divided into three lines, so the result becomes just one-third of the originally acting holding torque in each line. The same phenomenon occurs in FIGS. 14(*c*) and (*d*) and FIGS. 15(*e*) and (*f*) as well. As shown in FIGS. 16(*a*) to (*d*), if totaling the holding torques acting at the different rows, it is learned that the holding torque acting on the rotating member as a whole becomes just about half of the originally acting holding torque.

According to the present embodiment, the overall holding torque can be maintained at a constant value with no peak values. Furthermore, this constant value of the holding torque can be reduced to about half that of the prior art of FIGS. 20. By arranging the first electrodes and second electrodes of the counter electrodes like in FIG. 10(b), it is possible to maintain the generated power while reducing the Coulomb forces. Furthermore, it is possible to generate power by electret power generation without being affected by the Coulomb forces. The rest of the actions and effects are the same as in the first embodiment.

Third Embodiment

Figure 17:
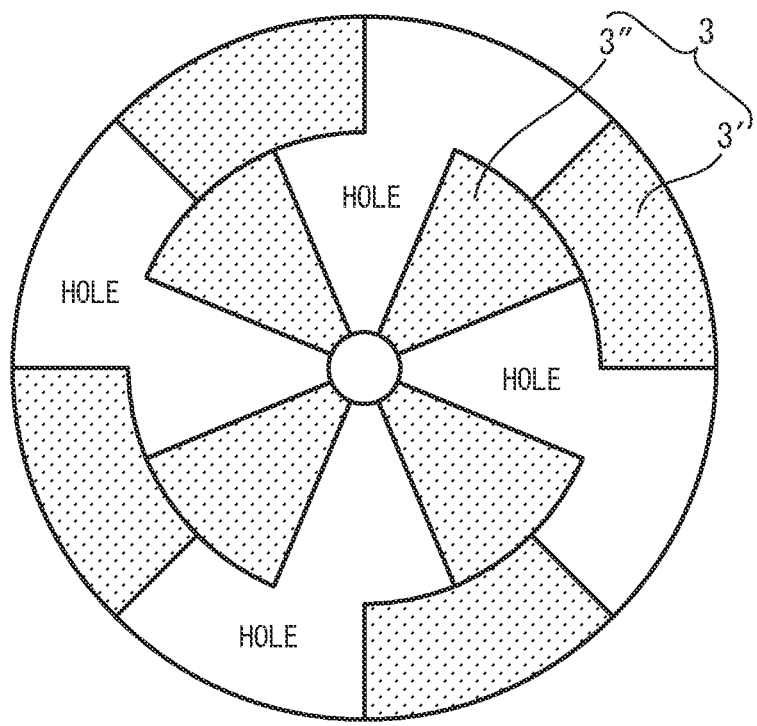
FIGS. 17(a) and (b) are views showing outlines of the counter electrodes and electrically charged films of the third embodiment of the present invention.
Figure 17:
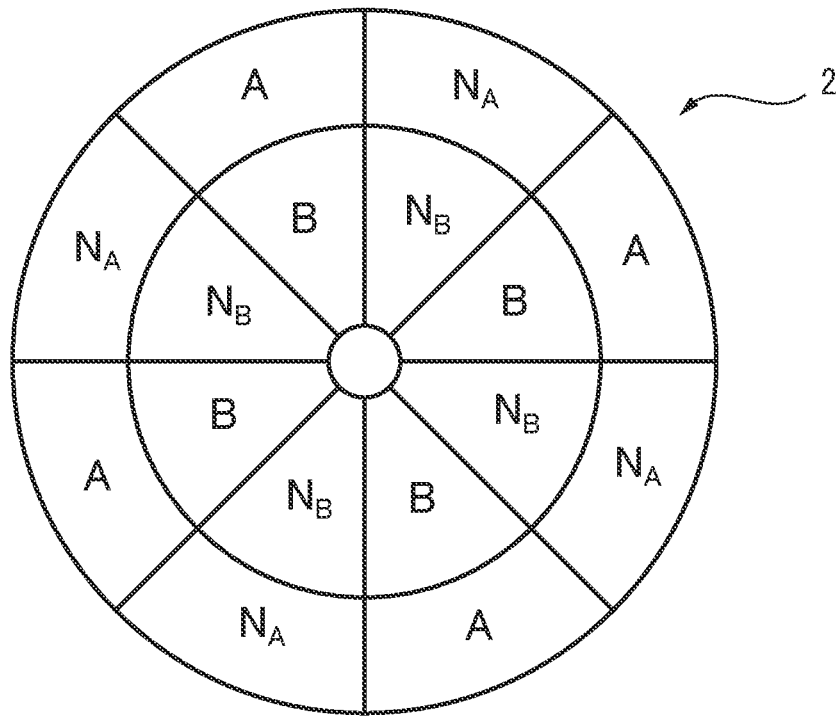

FIG. 17 are views showing outlines of the counter electrodes and electrically charged films of the third embodiment of the present invention.

The third embodiment is an embodiment in which the electrically charged films 3 of the bottom surface of the rotating member 4, as shown in FIG. 17(a), are set at the outer circumference side and the inner circumference side with a phase difference of exactly one-quarter of a cycle and the outer circumference line of electrodes of the first electrodes A and second electrodes NA at the outer circumference side and the outer circumference line of electrodes of the first electrodes B and second electrodes NB at the inner circumference side of the counter board 1 are, as shown in FIG. 17(b), not set with a phase difference. The rest of the configuration is the same as in the first embodiment. As shown in FIG. 17(a), corresponding to the outer circumference line of electrodes of the first electrodes A and second electrodes NA at the outer circumference side and the outer circumference line of electrodes of the first electrodes B and second electrodes NB at the inner circumference side of the counter board 1, the outer circumference side electrically charged films 3' and the inner circumference side electrically charged films 3" are offset in phase by exactly one-quarter. The outer circumference side electrically charged films 3' and the inner circumference side electrically charged films 3" are equal in area. These may also be connected.

Between the electrically charged films 3 and adjoining electrically charged films 3 of the offset outer circumference side electrically charged films 3' and inner circumference side electrically charged films 3", blank parts are formed. In the same way as the other embodiments, there is no input to the rectifier from the rotating electrically charged films 3.

At the inner circumference line of electrodes of the first electrodes B and the second electrodes NB at the inner circumference side, the interconnect connecting the plurality of first electrodes B will be referred to as the "B interconnect" while the interconnect connecting the plurality of second electrodes NB will be referred to as the "NB interconnect". In the same way as the first electrodes A and second electrodes NA, the inner circumference side first electrodes B and second electrodes NB are alternately arranged along the rotation direction at constant angular intervals in one line. The inner circumference side first electrodes B and second electrodes NB are arranged with zero phase difference from the outer circumference side first electrodes A and second electrodes NA. However, the outer circumference side electrically charged films 3' and inner circumference side electrically charged films 3" have a one-quarter phase difference, so along with rotation of the rotating member 4, the inner circumference side first electrodes B and second electrodes NB, like the outer circumference side first electrodes A and second electrodes NA, carry AC current with a delay of a phase difference of exactly one-quarter cycle. Similarly, if setting phase differences of the electrically charged films at the outer circumference line, intermediate line, and inner circumference line and making the phase differences of the three lines at the counter electrode side zero, three-phase alternating current can be output.

The alternating current generated at the outer circumference line of electrodes of the first electrodes A and second electrodes NA at the outer circumference side is input through the interconnects A and NA to the rectifying circuit 20. The alternating current generated at the inner circumference line of electrodes of the first electrodes B and the second electrodes NB at the inner circumference side is also input through the interconnects B and NB to the rectifying circuit 20 where it is rectified and is taken out in the same way as the DC current shown in FIG. 7. The two-phase alternating current waveform output from the above-mentioned power generation system is converted to direct current by the rectifying circuit 20 and passes through the step-down circuit 30 to charge the secondary cell 22. In the present embodiment as well, there is no need to take out current from the rotary shaft 8. It is sufficient to take out current from the fixed counter board, so the circuit configuration can be made extremely simple.

The action and effect of the third embodiment are similar to the first embodiment. It is usually necessary to punch out complicated blank parts from the rotating member 4, but the blank parts do not necessarily have to be formed. It is also possible to set offset outer circumference side electrically charged films 3' and inner circumference side electrically charged films 3" every 90° at a flat board.

In addition to the above-mentioned embodiments, the features of the present invention can also be applied to other embodiments. The first to third embodiments were explained for the mode of forming the electrically charged films at the rotating member 4, but it is also possible to provide the electrically charged films at predetermined intervals at the moving member moving reciprocally by translational motion instead of the rotating member 4 (PLT 3 added by citation). If similarly setting square shaped first and second electrodes such as seen in FIG. 7(a) and FIG. 13(a) at the counter board 1 fastened facing it, a similar action and effect are obtained as these embodiments.

In the first to third embodiments, as shown in FIG. 2, the gear 14 is fastened to the rotary shaft 8 at the top side of the rotating member 4 at the rotary shaft 8. Further, the gear 15 fastened to the shaft 9 and the gear 14 fastened to the rotary shaft 8 are provided as the gear transmission mechanism (gear train) from the rotating weight 10 fastened to the shaft 9 to the rotary shaft 8. Two or more gear trains may be provided. On the other hand, the rotating weight 10 may be directly provided at the rotary shaft 8. Furthermore, it is also possible to provide a weight at the rotating member 4 for use instead of the rotating weight. In these cases, the gear transmission mechanisms 15 and 14 are unnecessary.

Furthermore, as shown in PLTs 1 and 2, it is also possible to apply the features of the counter electrodes and electrically charged films of the first to third embodiments to an embodiment in which a weight is provided at the rotating member 4, a hair spring (timepiece term, spiral spring) is provided between the shaft 8 and housing 33 (on this point, PLTs 1 and 2 are added by citation), one end of the hair spring is fastened by a stud (timepiece term, support rod) to the housing, and the other end of the hair spring is fastened to the rotary shaft 8 by a hairspring collet (timepiece term, annular ring) by press-fitting or shrink fitting. This embodiment may also provide a bearing between the gear 14 and rotary shaft 8, have one end of the hair spring fastened by a stud to the gear 14, and have the other end of the hair spring fastened to the rotary shaft 8 by a hairspring collet by press-fitting or shrink fitting. Furthermore, the features of the counter electrodes and electrically charged films provided at the lower side of the rotating member 4 of the first to third embodiments may be obtained not only at the lower side but simultaneously also at the upper side of the rotating member 4.

Fourth Embodiment

Figure 18:
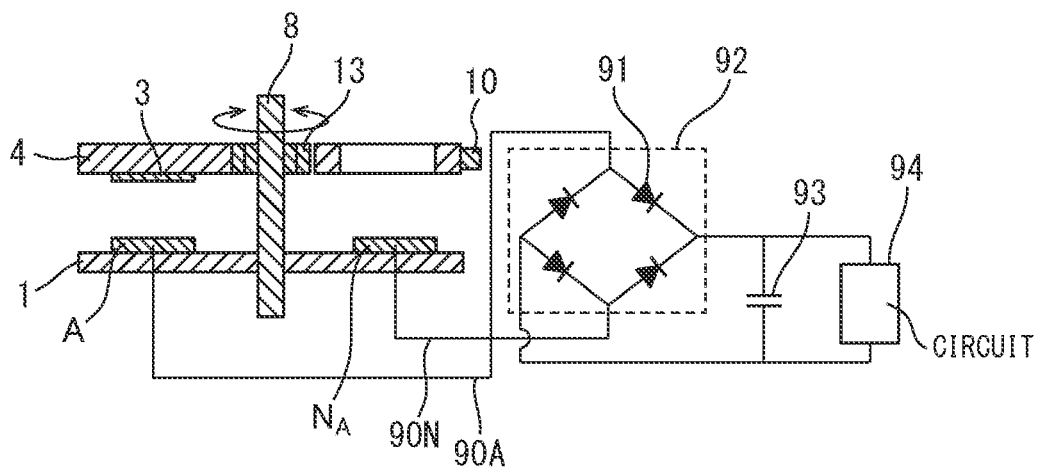
FIGS. 18(a) to (c) are views showing outlines of the counter electrodes and electrically charged films of the prior art PLT 1.
Figure 18:
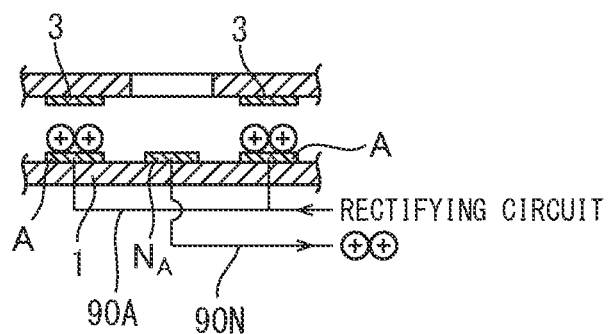
Figure 18:
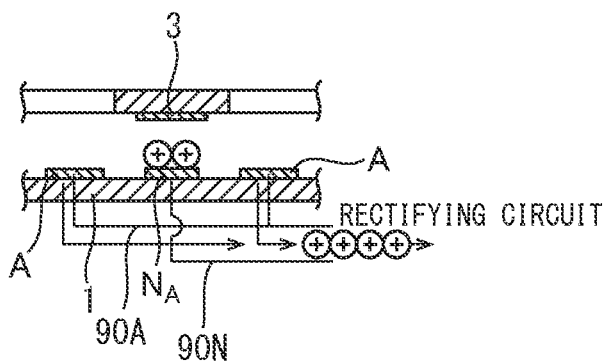
Figure 19:
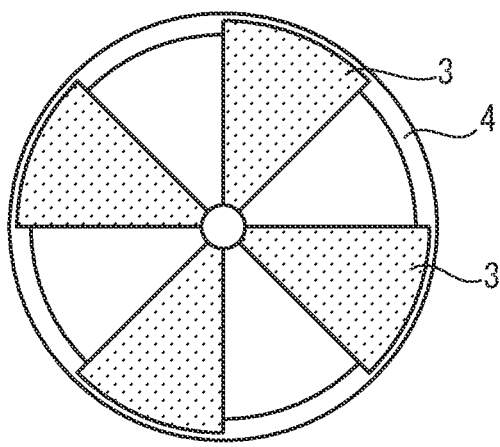
FIGS. 19(a) to (c) are explanatory views of the counter electrodes and electrically charged films of PLT 1.
Figure 19:
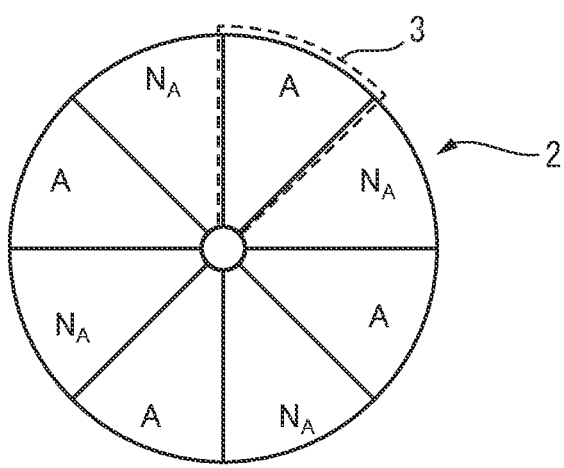
Figure 19:
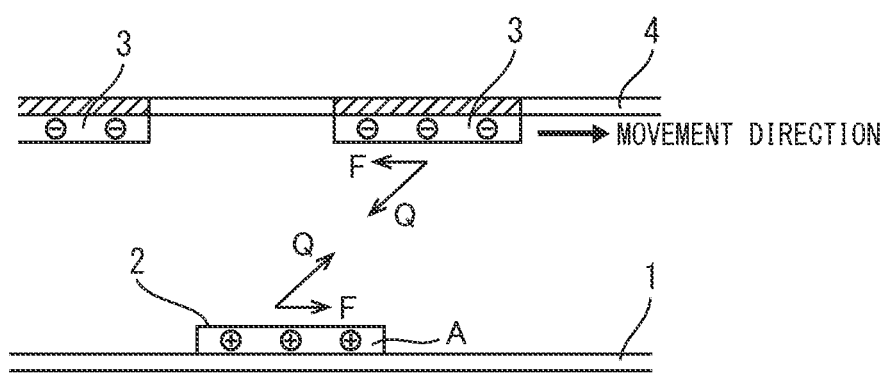

In the conventional electrostatic induction generator of FIGS. 18 and 19, the efficiency of utilization of the power obtained from the generator was not considered much at all. In particular, in applications for portable devices, charging the generated power once into a charge storing means such as a secondary cell is necessary. The efficiency of charging from the generator to the charge storing means (power extraction efficiency) becomes important. Here, consider the efficiency in the case where due to the output of the electrostatic induction generator, the input impedance such as of the secondary cell is low and a voltage load deemed to be a substantially constant voltage is charged. Note that, the ratio of the power able to be taken out at a certain circuit load to the power consumed by a resistance load when connecting a resistance load matched with the output impedance of the generator is defined as the efficiency. In particular, the former corresponds to the theoretical maximum power able to be taken out from this generator.

Figure 21:
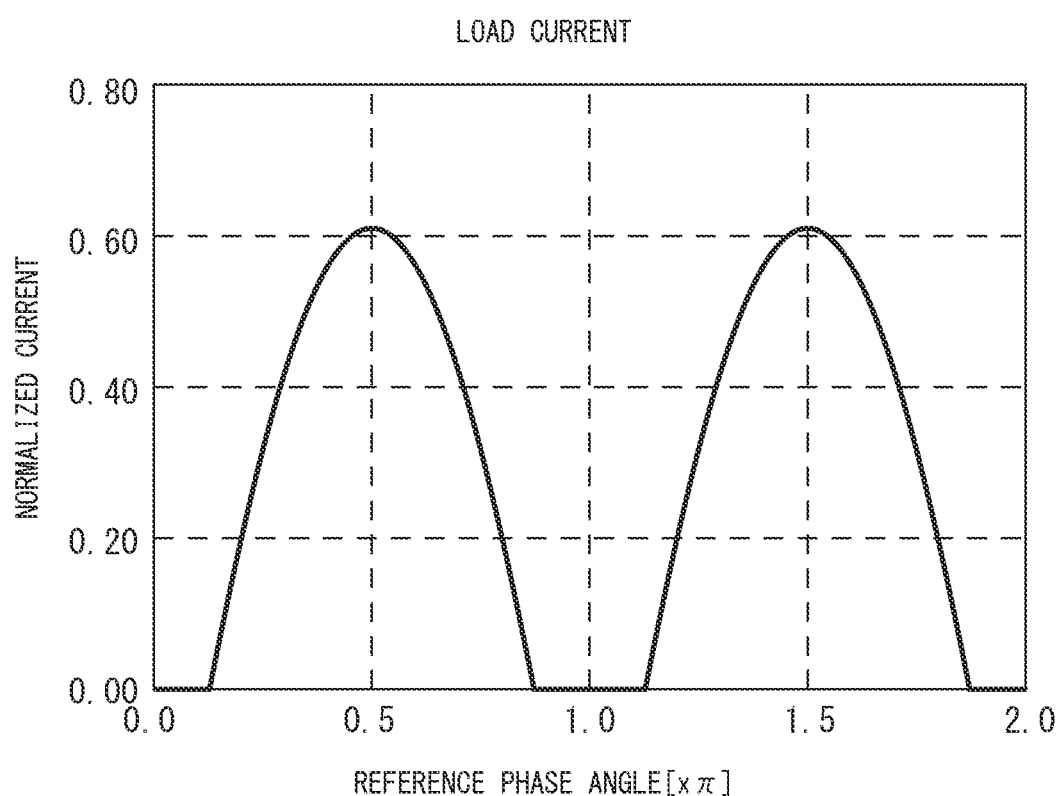
FIG. 21 is a waveform diagram showing the output current waveform according to the charging circuit.

For simplification, the power generation voltage waveform is assumed to be a sine wave of a constant amplitude. It is assumed that this power generation output is rectified by a full wave at ideal diodes with a forward direction voltage of 0V. If connecting a constant voltage load to this rectified output for charging, the result becomes a current waveform comprised of the sine wave such as shown in FIG. 21 offset to the lower side to give just the top part of the amplitude. This is because the foot parts of the power generation voltage waveform end up becoming a voltage lower than the load, so a time arises in which no voltage is substantially applied to the load and a charging current cannot be obtained.

According to analysis by computer simulation, in such a case, the average charging power was maximum when the terminal voltage of the constant voltage load was 0.394 time the half amplitude of the power generation voltage. This charging power is about 92.3% of the maximum extracted power when connecting a resistance load of a good fit with the output impedance of this generator.

That is, if considering the basic wave component of the power generation waveform, even if driving a constant voltage load through the ideal rectifying circuit, the power able to be taken out at the power load is about 92% of the theoretical maximum value. This is because the ripple width of the power generation voltage component which is substantively applied is large. Furthermore, if considering the loss due to the general forward direction voltage of the diodes, the efficiency falls more.

In the electrostatic induction generator of the fourth embodiment of the present invention, the following configuration is employed.

The electrostatic induction generator is comprised of a rotor having electrically charged parts and able to rotate and a stator facing the rotor across an air gap of a predetermined distance and having conductor parts. The electrically charged parts comprise a plurality of C-fan shaped regions with predetermined center angles arranged radially from the center of rotation of the rotor, the conductor parts comprise a plurality of ring-shaped regions arranged in concentric circles from a position on the axis of center of rotation of the rotor, furthermore the ring-shaped regions are respectively divided into pluralities of C-fan shaped small electrodes with center angles equal to the above center angles, adjoining small electrodes in one ring-shaped region are alternately connected to output terminals and common terminals of the ring-shaped regions, and a number of output terminals the same as the number of the ring-shaped regions are provided.

Due to this, it becomes possible to provide an electrostatic induction generator which solves the problem in the prior art and enables maximization of the takeout power even when connecting a constant voltage load. Specifically, by dividing the electrode surface of the electrostatic induction generator into ring-shaped regions, it becomes possible to generate and output a multiphase alternating current. In particular, by the arrangement of electrodes in the ring-shaped regions, it becomes possible to generate a three-phase alternating current able to be generally used as a power source of drive power. The theoretical maximum efficiency when rectifying this three-phase alternating current by the full wave mode to drive a constant voltage load can be improved up to about 97%. Furthermore, the half amplitude of the power generation voltage becomes $\sqrt{3}$ of the prior art, so there is also the effect of reduction of the loss due to forward direction voltage of the diodes.

Further, in addition to such an electrical effect, by dividing the electrode surface into ring-shaped regions, there is also the mechanical effect that it is possible to lower the torque acting to keep the rotor at a certain angle of the stator due to the Coulomb forces acting between the rotor and stator and therefore the rotor can more easily start to rotate when a rotational torque is applied from the outside.

Figure 22:
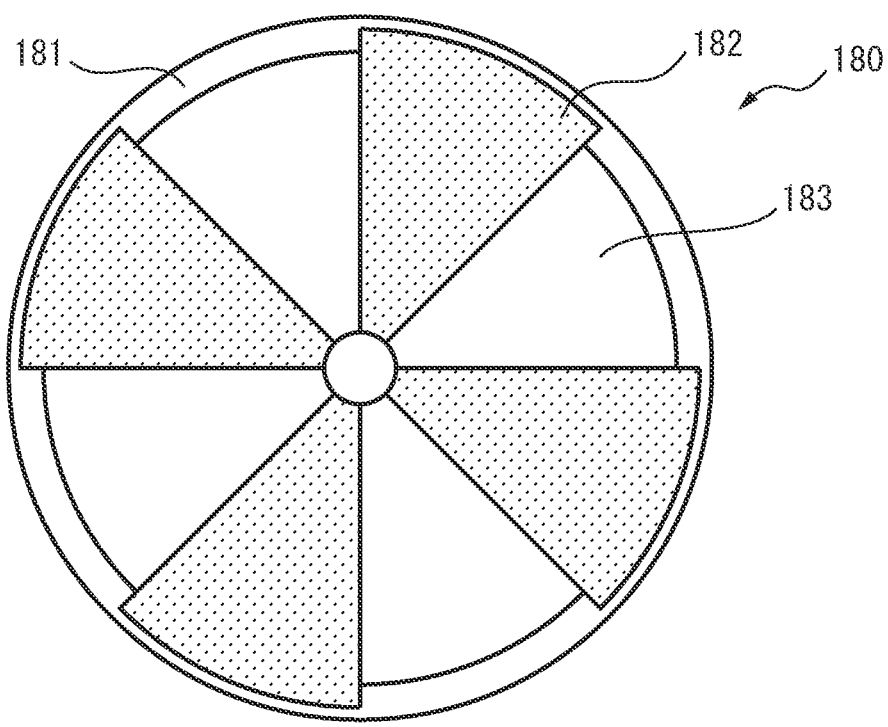
FIG. 22 is a plan view showing the configuration of a rotor in the electrostatic induction generator of a fourth embodiment of the present invention.

Below, the fourth embodiment for realizing such an electrostatic induction generator will be explained in detail while referring to the drawings. As shown in FIG. 22, the rotor 180 is a circular rotary body provided with a plurality of C-fan shaped electrically charged parts. Here, "C-fan shape" means a fan shape from which a fan shape smaller than that fan shape is removed from the side close to the center angle. The rotor 180 is formed in the following way.

The rotor 180 is formed by working a base material 181 with a high degree of flatness such as glass or silicon with an even thickness of about 0.5 mm to a circular shape by etching or other processing and forming the surface into radial shapes. Here, the surface of the rotor 180 is divided into eight equal parts in the circumferential direction and is worked so that parts of the base material 181 corresponding to four regions among these remain at equal intervals. In FIG. 22, the parts from which the base material 181 is removed by this processing are shown as slits (holes) 183. The slits 183 are C-fan shaped and are arranged at equal intervals in the circumferential direction of the rotor 180.

Furthermore the surface of the base material 181 remaining after being worked is formed with electrically charged thin films 182 having the functions of holding the charges such as a fluororesin or silicon dioxide ($SiO_2$) to thereby form the rotor 180. This electrically charged thin films 182 correspond to the electrically charged parts. The shapes of the electrically charged thin films 182 are formed to become a C-fan shapes copying the shapes of the base material 181.

After that, the electrically charged thin films 182 on the surface of the base material are treated to charge them. As the charging treatment, the method of using electrodes able to generate a high voltage to sandwich the top and bottom surfaces of the rotor and applying voltage in that state or the method of using corona discharge may be mentioned. As the method of corona discharge, needle-shaped electrodes fastened a distance of several mm away from the electrically charged thin films 182 are given voltages of −2000V to −8000V or so to inject negative charges to the electrically charged thin films 182.

Figure 23:
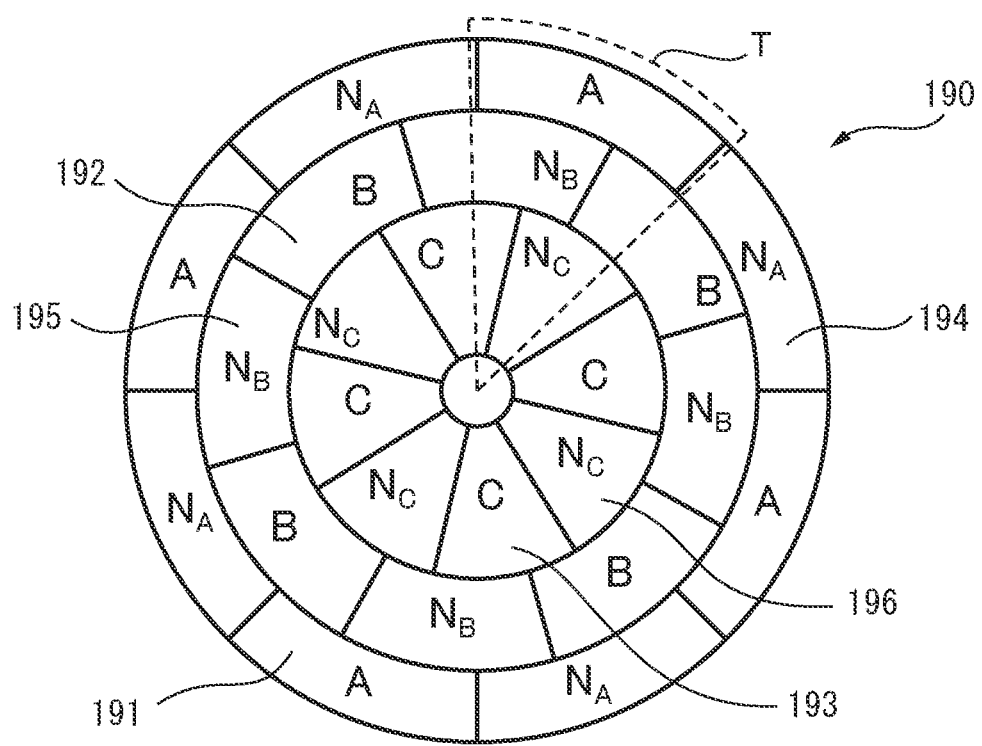
FIG. 23 is a plan view showing the configuration of a stator in the electrostatic induction generator of the fourth embodiment of the present invention.

As shown in FIG. 23, the stator 190 is a circular electrode board provided with conductor parts formed by a plurality of C-fan shaped small electrodes. The stator 190 is formed as follows: The stator 190 is comprised of a glass epoxy board or polyimide board or other such insulating base material or a base material with a dielectric constant lower than that on the surface of which conductor parts are provided to form a printed circuit board. The conductor parts on the surface area divided by etching etc. to form a plurality of C-fan shape small electrodes. Specifically, the stator 190 is formed with three ring-shaped regions divided into concentric circles. Furthermore, these ring-shaped regions are divided in the circumferential direction to form small electrodes.

The outermost circumference ring-shaped region is divided into eight in the circumferential direction to form small electrodes corresponding to the A-phase. The small electrodes corresponding to the A-phase are the A-phase electrodes 191 and the A-phase common electrodes 194. These are alternately arranged to give ring shapes. The innermost circumference ring-shaped region corresponds to the C-phase and similarly has the C-phase electrodes 193 and C-phase common electrodes 196 alternately arranged. The ring-shaped region sandwiched between the A-phase and the C-phase corresponds to the B-phase and similarly has the B-phase electrodes 192 and B-phase common electrodes 195 alternately arranged. Note that, these small electrodes are made the same sizes as the above-mentioned electrically charged thin films 182. The A- to C-phase electrodes 191 to 193 and A- to C-phase common electrodes 194 to 196 correspond to the conductor parts.

All of the small electrodes marked as A in FIG. 23 correspond to A-phase electrodes 191. Similarly, all of the small electrodes marked as B correspond to the B-phase electrodes 192 while all of the small electrodes marked as C correspond to the C-phase electrodes 193. Furthermore, all of the small electrodes marked as NA correspond to the A-phase common electrodes 194. Similarly, all of the small electrodes marked as NB correspond to the B-phase common electrodes 195, while all of the small electrodes marked as NC correspond to the C-phase common electrodes 196.

In particular, the small electrodes on this stator 190 are obtained, like in the rotor 180, by dividing the surface into eight equal parts of C-fan shapes with center angles of 45°. Furthermore, the relative position of a certain A-phase electrode 191 with respect to the closest B-phase electrode 192 is made to become a position rotated clockwise 30° seen from the center of the stator 190. Similarly, the relative position of a certain A-phase electrode 191 with respect to the closest C-phase electrode 193 is made to become a position rotated counterclockwise 30° seen from the center of the stator 190.

This angle of 30° is ⅓ of 90°. When viewed as the phase angle of arrangement of the electrodes of the different phases, this is equal to 120°. This is because in the ring-shaped regions of the different phases, the electrodes of the output terminals and common electrodes are alternately arranged at a 45° pitch, so the period of arrangement of the electrodes of the different phases is double that or a 90° pitch.

By arranging small electrodes in this way, even when the rotor 180 rotates clockwise in the state facing this stator 190, a power generation waveform delayed by a phase angle of 120° from the power generation waveform appearing at the A-phase electrodes 191 appears at the B-phase electrodes 92 and, furthermore, a power generation waveform delayed by a phase angle of 120° appears at the C-phase electrodes 193, so a so-called three-phase alternating current signal is obtained. In particular, this phase angle of 120° is the phase angle obtained by dividing the 360° corresponding to the phase angle of one cycle by the number of output phases, 3, of the generator.

Further, the widths of the ring-shaped regions in the radial direction are changed between the outer circumference side and inner circumference side and divided so that all of the small electrodes become equal in areas. That is, the radii of the concentric circles of the ring-shaped regions are set so that all of the A-phase electrodes 191, B-phase electrodes 192, C-phase electrodes 193, A-phase common electrodes 194, B-phase common electrodes 195, and C-phase common electrodes 196 become the same areas. In this example, the ring-shaped region corresponding to the C-phase is the inner circumference side, so the width of the C-phase ring-shaped region in the radial direction from the center of rotation is the longest. The width of the B-phase ring-shaped region in the radial direction is next longest, while the width of the outermost circumference A-phase ring-shaped region in the radial direction becomes the shortest.

By making the ring-shaped regions such a shape, when the rotor 180 rotates, the amounts of change of the areas by which the electrically charged thin films 182 face the small electrodes become equal for the A-phase electrodes 191, B-phase electrodes 192, and C-phase electrodes 193, so the values of the A-phase electrodes 191, B-phase electrodes 192, and C-phase electrodes 193 corresponding to the output impedances become substantially equal and the amounts of current obtained from the different phases become balanced with the connected loads. Note that, while not shown, the divided A-phase electrodes 191 are connected on the board so that all become the same potentials. Further, similarly, the divided B-phase electrodes 192 are also all connected on the board and the C-phase electrodes 193 are also all connected on the board. These A-phase, B-phase, and C-phase electrodes 191 to 193 are taken out from the board of the stator 190 to the outside by conductors and connected to the later explained full wave rectifying circuit as output terminals of the generator.

On the other hand, the common electrodes 194 to 196 of the A-phase, B-phase, and C-phase are taken out at the back side of the board by thru holes and all connected. Note that, by connecting the common electrodes in this way, this generator functions as a so-called star-connection (also called "Y-connection", same below) three-phase alternating current generator. That is, the A-phase, B-phase, and C-phase electrodes 191 to 193 function as the output terminals of the phases of the generator. Further, the common electrodes 194 to 196 of the A-phase, B-phase, and C-phase become equal potentials and function as the neutral line N.

Figure 24:
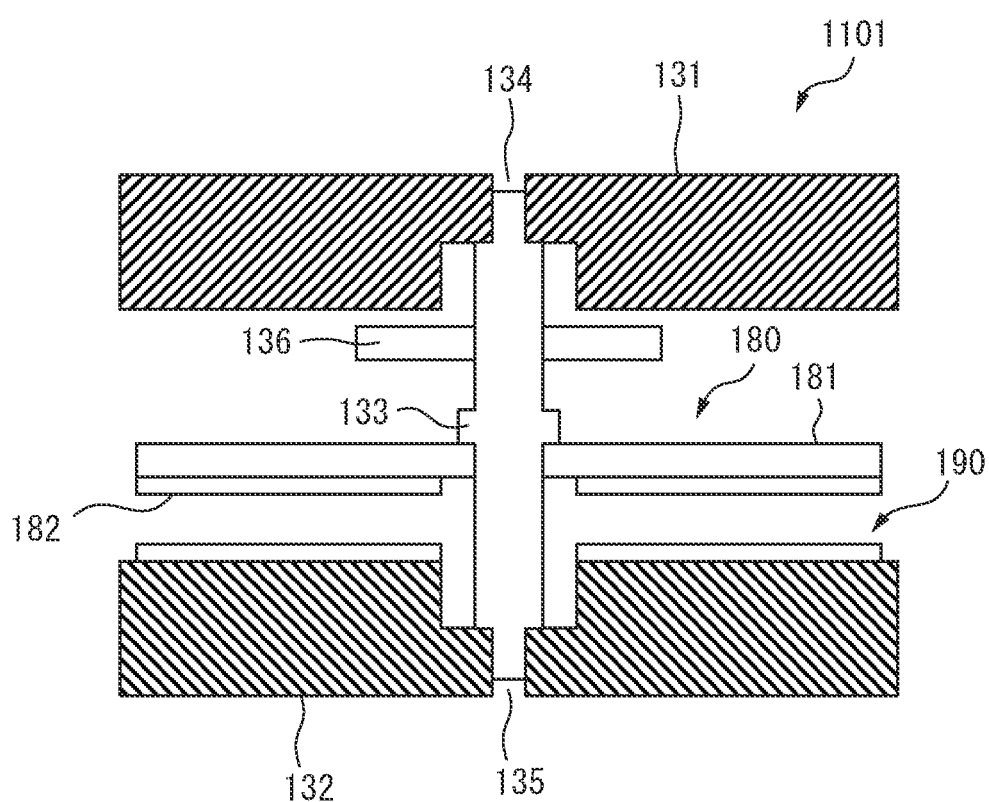
FIG. 24 is a cross-sectional view showing the configuration of the electrostatic induction generator of the fourth embodiment of the present invention.

Next, FIG. 24 will be used to explain the structure of an electrostatic induction generator of a fourth embodiment of the present invention. As shown in FIG. 24, the electrostatic induction generator 1101 is made a structure able to hold the above-mentioned rotor 180 and stator 190 in a state made to face each other while maintaining a certain air gap distance. To enable rotation of the rotor 180 in this state, a shaft body 133 is fit into the rotor 180 to form a spinner shaped rotary body. The two ends of the shaft body 133 form tenons. The tenons of the shaft body 133 are received by a shaft hole 134 and shaft hole 135 respectively provided in the upper receiving part 131 and lower receiving part 132 having the functions as bearings so as to hold the rotary body. Note that, the shaft body 133 has a power transmission gear 136 with the same center axis as this fit over it. Rotational force from the outside torque input source meshing with this can be transmitted to the rotor 180.

The upper receiving part 131 and lower receiving part 132 are fastened so that the air gap between the surface of the electrically charged thin film 182 and the small electrode surface formed on the stator 190 surface can be maintained at a distance of 50 microns to 100 microns. In electrostatic induction power generation, the induced voltage is higher the narrower the gap between the electrodes, so the structure is made one in which the air gap distance is as narrow as possible and the fluctuation of the same becomes smaller. As the structure for this, a temporary holding mechanism used for a mechanical type clock or other known mechanical structure can be utilized. Similarly, it is possible to use synthetic ruby or other jewel bearings for the shaft hole 134 and shaft hole 135.

By employing such a structure, the electrostatic induction generator 1101 of the present embodiment can maintain a substantially constant distance air gap at the time the rotor 180 engages in rotary motion while changing the facing area of the electrically charged thin films 182 and small electrodes on the surface of the stator 190. That is, it becomes possible to induce or release a charge on the surfaces of the small electrodes due to the electrostatic induction phenomenon and becomes possible to cause the device to function as a power generation system.

In the thus configured electrostatic induction generator 1101, between the A-phase electrodes 191 and the A-phase common electrodes 194, the air gap distance is set so that a half amplitude 11.6 V voltage is generated. As will be understood from the electrode shapes of the stator 190, the B-phase and the C-phase become equal in characteristics with respect to the A-phase, so between the B-phase electrodes 192 and the B-phase common electrodes 195 and between the C-phase electrodes 193 and the C-phase common electrodes 196, the voltage amplitude becomes the same. Note that, this voltage corresponds to the so-called phase voltage.

Further, as explained above, the values corresponding to the output impedances of the A-phase electrodes 191, B-phase electrodes 192, and C-phase electrodes 193 are set to become substantially equal.

Accordingly, since the different phases of output impedances and output voltages are equal, it is clear that the powers output from the A-phases, B-phases, and C-phases become equal.

Figure 25:
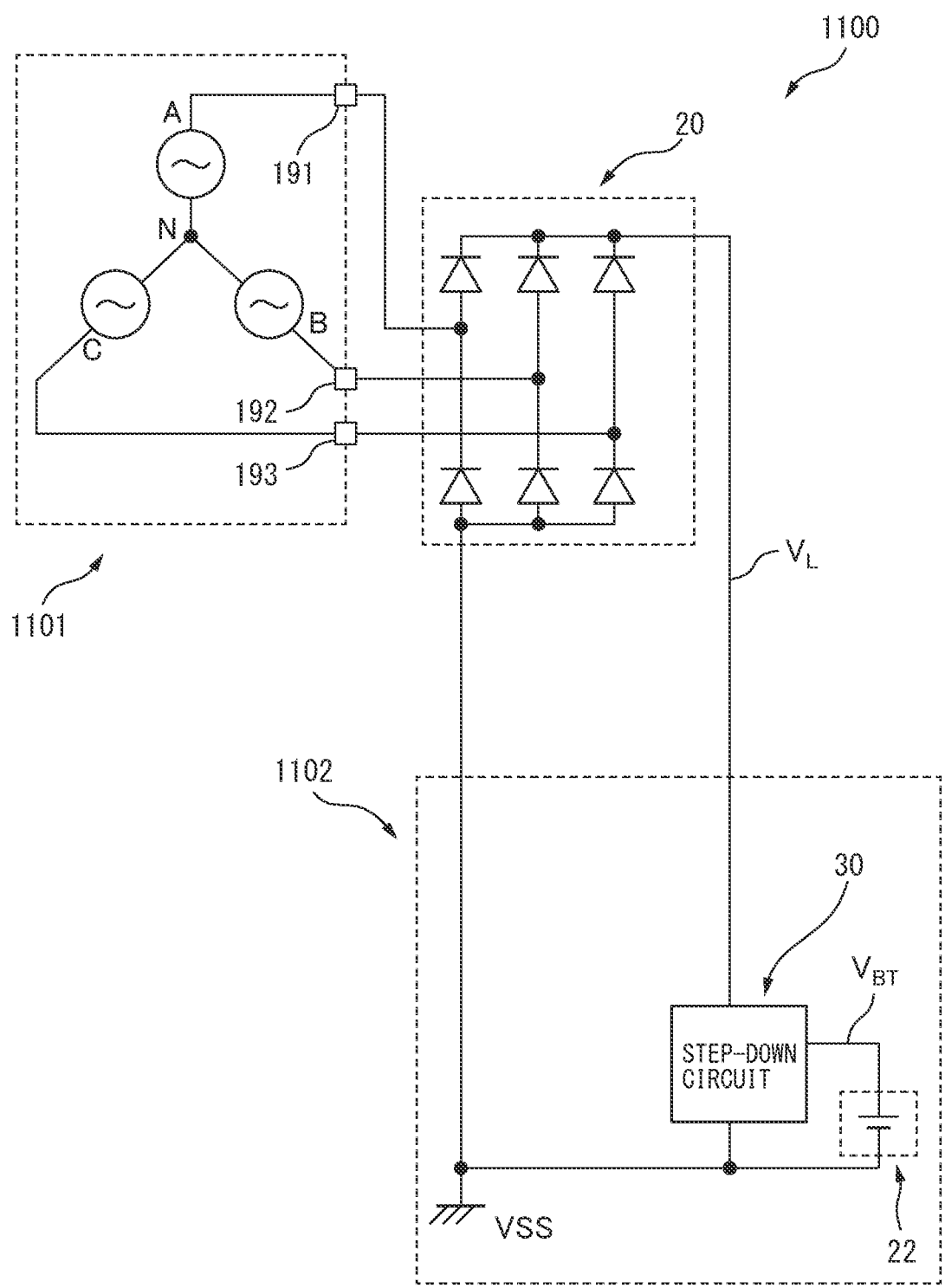
FIG. 25 is a circuit diagram showing a charging circuit of the fourth embodiment of the present invention.

Next, FIG. 25 will be used to explain a charging circuit using the electrostatic induction generator of the present embodiment. The charging circuit 1100 is comprised of the above-mentioned electrostatic induction generator 1101, full wave rectifying circuit 20, step-down circuit 30, and charge storing means 22.

The A-phase electrodes 191, B-phase electrodes 192, and C-phase electrodes 193 of the electrostatic induction generator 1101 are connected to the input side of the full wave rectifying circuit 20. The neutral line N is a terminal connecting the different phases of common electrodes, but this example is configured with the different phases of power generation characteristics matched, so the neutral line N may be left unconnected.

The full wave rectifying circuit 20 is a well known full wave rectifying circuit using six diodes and able to rectify a three-phase input in a full wave mode. Note that, as the diodes used for this full wave rectifying circuit 20, PIN diodes with sufficient resistance to application of reverse voltage, with little leak current due to reverse voltage, and with a small capacity between terminals are used. A step-down circuit 30 is connected to the output of the full wave rectifying circuit 20. The step-down circuit 30 is a circuit for outputting high voltage input converted to a low voltage at a high efficiency while the power remains substantially constant.

In general, the power generation voltage of the electrostatic induction generator 1101 becomes a high voltage over 10 V. On the other hand, the stored voltage of the charge storing means 22 used for a mobile electronic device is several volts. If taking out power from such a generator, if just directly connecting the charge storing means 22 for charging, the efficiency will end up becoming poor. In the charging circuit of the present embodiment, a step-down circuit 30 is used for the purpose of solving this problem.

To the output of the step-down circuit 30, a secondary cell constituting the charge storing means 22 is connected. The step-down circuit 30 is configured to be able be charged with a current output as a result of the power being converted to a low voltage and high current. Here, the terminal voltage of the charge storing means 22 is made 1.5V. As explained next, the step-down circuit 30 and charge storing means 22 are circuits which, viewed from the full wave rectifying circuit 20 side, act as a constant voltage load circuit 1102 resembling an almost constant voltage (load voltage VL) voltage supply and enable the charge storing means 22 to be charged at a high efficiency.

Figure 26:
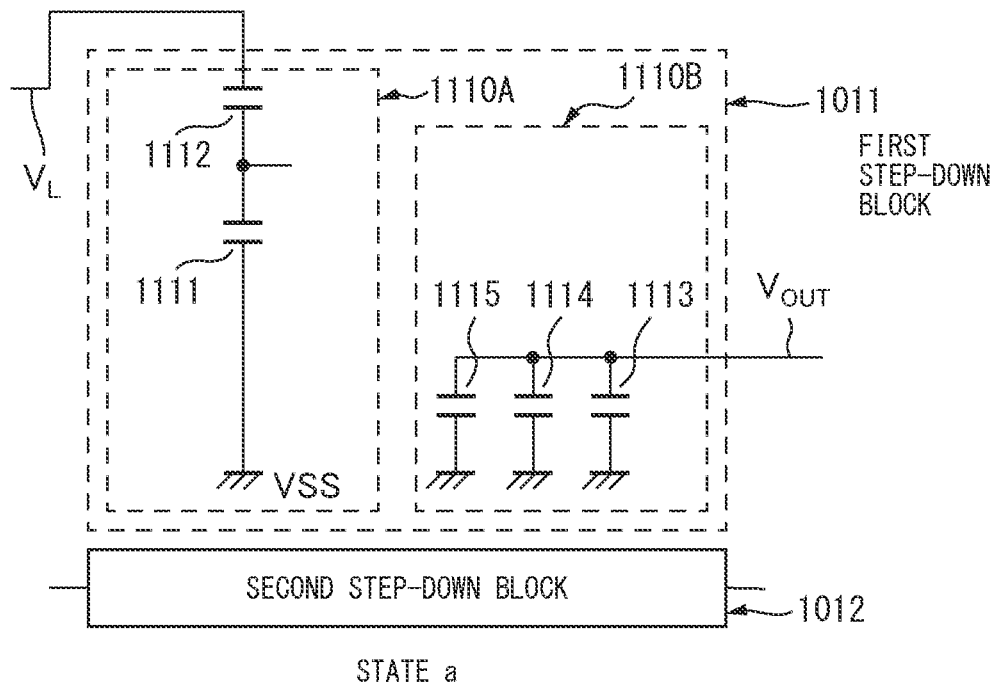
FIG. 26 are circuit diagrams showing the configuration of a step-down circuit in the charging circuit of the fourth embodiment of the present invention. (a) shows the state "a" while (b) shows the state "b".
Figure 26:
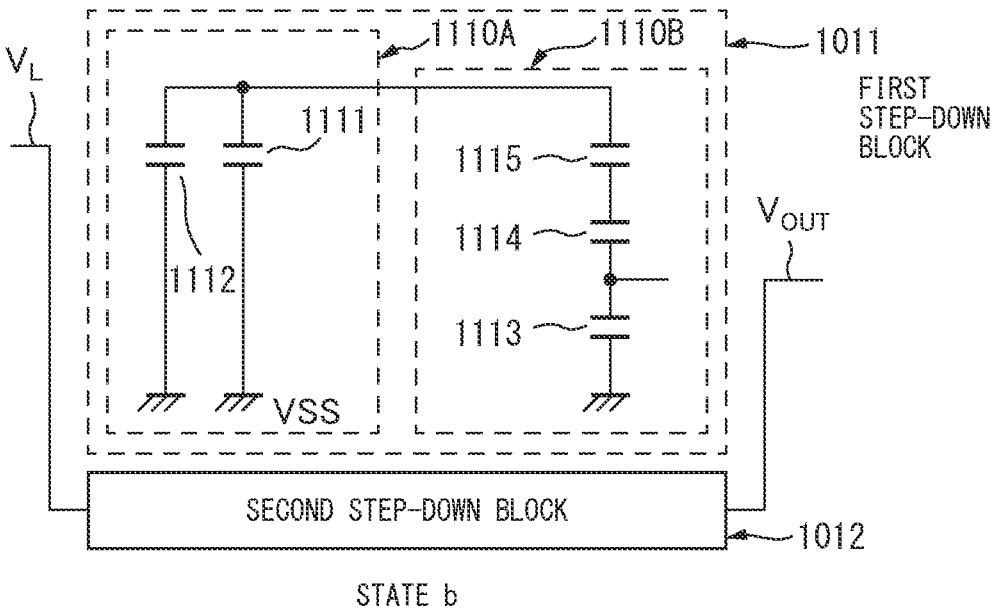

FIG. 26 will be used to explain the configuration of the step-down circuit 30. The step-down circuit 30 is comprised of a first step-down block 1011 and a second step-down block 1012. The step-down rate "n" of the step-down circuit 30 is 6, that is, six-fold step-down is performed.

The first step-down block 1011 and the second step-down block 1012 are step-down circuits which are configured the same, but operate at opposite phases from each other, that is, while one is operating to store power, the other is operating to discharge power.

Each step-down block is provided with a plurality of capacitors. The state of connection between the capacitors is switched by a so-called analog switch comprised of MOS transistors. The switch is of a known configuration, so is not shown. Each step-down block, as shown in FIG. 26, is comprised of a first step-down stage 1110A for two-fold step-down of the output of the full wave rectifying circuit 20 and a second step-down stage 1110B for three-fold step-down of the output of the first step-down stage 1110A and output to the charge storing means 22.

The first step-down stage 1110A is provided with two capacitors for a two-fold step-down operation, that is, the capacitor 1111 and capacitor 1112. The first step-down stage 1110A operates to switch all of the capacitor 1111 and capacitor 1112 between serial or parallel connection.

Further, the second step-down stage 1110B is provided with three capacitors for a three-fold step-down operation, that is, the capacitor 1113, capacitor 1114, and capacitor 1115. The second step-down stage 1110B operates to switch all of the three capacitors of the capacitor 1113, capacitor 1114, and capacitor 1115 between serial or parallel connection.

The state of connection of the capacitors can be switched by a rectangular wave clock signal able to be generated by a known oscillation circuit. The waveform of this clock signal is not shown, but the time periods of the state "a" of FIG. 26(a) and the state "b" of FIG. 26(b) are made 50 msec and these two states are controlled to be alternately switched between.

It is also possible to provide a slight time period so that the capacitors will not short-circuit by the switches forming the step-down blocks simultaneously being turned on at the moment of this switching operation. This time period can be set to the minimum required time duration of several nano to tens of nano seconds by a known method for generating a delay time.

FIG. 26 will be used to simply explain the operation of the step-down circuit 30. The capacitor in the step-down circuit 30, as explained above, starts a switching operation to thereby perform a step-down operation. That is, a capacitor in the state storing a charge from the output of the full wave rectifying circuit 20 rises slightly in terminal voltage due to storing a charge, but when the capacitor is in a discharge state, the charge stored in the capacitor is instantaneously taken into the charge storing means 22 and becomes equal to the terminal voltage of the charge storing means 22. This is because the impedance of the charge storing means 22 is low.

Accordingly, when the step-down circuit 30 performs a step-down operation, the voltage across the terminals of each capacitor of the second step-down stage 1110B becomes substantially equal to the stored voltage $V_{BT}$ at all times and the voltage across the terminals of each capacitor of the first step-down stage 1110A becomes substantially equal to three times the stored voltage $V_{BT}$ at all times. As a result, the input side voltage of the step-down circuit 30, that is, the load voltage $V_L$, becomes a voltage about six times the stored voltage $V_{BT}$.

In this way, at the input side of the step-down circuit 30, a voltage value of the stored voltage $V_{BT}$ multiplied with the step-down ratio "n" appears. At the input side terminal of this step-down circuit 30, the voltage does not change much at all even if the generated current flows in, so except for the very slight time period at which the connected state of the step-down circuit 30 is switched, the step-down circuit 30 constantly behaves as if the voltage value were the voltage supply of $n \cdot V_{BT}$. The voltage value of the load appearing like this constant voltage supply corresponds to the above-mentioned load voltage $V_L$, whereby $$V_L = n \cdot V_{BT}$$

stands.

In particular, by making two step-down blocks operate complementarily, even while one of the step-down blocks is in the discharge state and is not connected to the electrostatic induction generator 1101, the other of the step-down blocks can be connected to the electrostatic induction generator 1101 and remain in the charging state, so it is possible to obtain a state where a constant voltage load is constantly connected to the electrostatic induction generator 1101 and the electrostatic induction generator 1101 can constantly take out power at the point of time of power generation.

Furthermore, in this step-down operation, all of the capacitors inside the step-down circuit 30 are kept down in loss accompanying electron movement since only a slight voltage change occurs in the terminal voltages even through the operation of receiving the charge. As a result, this step-down circuit 30 can move a charge to the charge storing means 22 in a state with a terminal voltage lower than the input voltage with almost no loss.

Therefore, by configuring the step-down circuit 30 in this way, it is possible to connect a load appearing like a constant voltage supply at all times without any time when the electrostatic induction generator 1101 becomes no-load and it becomes possible to transmit the power generation output to the charge storing means 22 with low loss.

The operation of the charging circuit 1100 will be explained using FIG. 24, FIG. 25, and FIG. 27. If a torque is transmitted from a not shown rotation drive source to the power transmission gear 136 of the electrostatic induction generator 1101, the rotor 180 starts to rotate. Here, for simplification, the operation in the case where the power generation of the electrostatic induction generator 1101 is in the steady state and where the rotor 180 is rotating by a constant angular velocity $\omega_r$ will be explained.

If assuming the electrostatic induction generator 1101 is in the no-load state, if viewing the power generation output generated from the A-phase electrodes 191 as the voltage signal, as the basic wave component, a power generation voltage of $VA(t)V0 \cdot \sin(\omega \cdot t)$ is obtained. However, $\omega = 4 \cdot \omega_r$. The angular frequency of the power generation output is four times the rotational angular velocity of the rotor 180 because there are four electrically charged thin films 182 on the surface of the rotor 180.

Similarly, from the B-phase electrodes 192 and C-phase electrodes 193, the power generation voltage is obtained:

$$VB(t) = V0 \cdot \sin(\omega \cdot t - 2 \cdot \pi/3)$$

$$VC(t) = V0 \cdot \sin(\omega \cdot t + 2 \cdot \pi/3)$$

This is because, as explained above, the positions of arrangement of the B-phase electrodes 192 and C-phase electrodes 193 with respect to the A-phase electrodes 191 are changed in the circumferential direction. In the following explanation, this signal phase of the A-phase power generation voltage will be used as the reference phase.

The power generation output from these phases is rectified by the full wave rectifying circuit 20 and is input to the step-down circuit 30. The step-down circuit 30 performs a step-down operation as explained before by an internal clock and outputs current to the charge storing means 22. The charge storing means 22 is a secondary cell, so the terminal voltage does not rapidly change. For this reason, from the step-down circuit 30 on, the terminal voltage of the charge storing means 22 appears to be a voltage load of a six times larger substantially constant voltage. That is, it operates so that a constant voltage supply of a load voltage $V_L$ is connected to the full wave rectifying circuit 20. In actuality, a current of six times the current flowing from the full wave rectifying circuit 20 to the step-down circuit 30 flows to the charge storing means 22 whereby the charge storing means 22 is charged.

Figure 27:
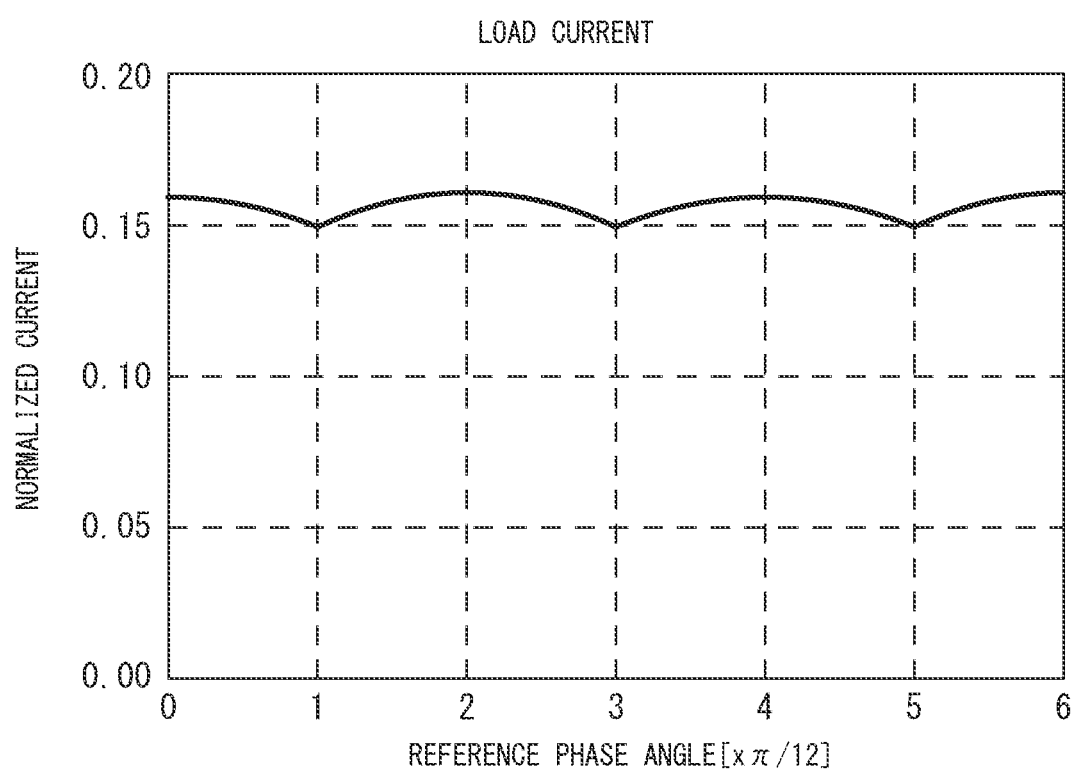
FIG. 27 is a waveform diagram showing the output current waveform of the charging circuit of the fourth embodiment of the present invention.

FIG. 27 shows an example of the load current waveform when connecting a constant voltage load of a certain terminal voltage to this charging circuit 1100. Note that here, for simplification, it is assumed that the full wave rectifying circuit 20 is an ideal diode and that the forward direction voltage is 0.

The waveform of the load current changes depending on the terminal voltage of the constant voltage load, but FIG. 27 illustrates the current waveform when the phase of the power generation voltage is exactly $m \cdot \pi/12$ ("m" is an odd number) and the value of the voltage of the constant voltage load is set so that valleys of the ripple of the current waveform appear. In this state, the time interval at the points of the ripple forming valleys is constant, but if doing this, the differences between the local maximums and local minimums of the current become extremely small.

Next, the charging efficiency by this charging circuit 1100 will be explained. The power generation voltage of the electrostatic induction generator 1101 is mainly determined by the surface charge density of the electrically charged thin films 182 and the air gap distance and becomes the same power generation voltage as the case like in the prior art of not dividing the stator 190 into ring-shaped regions but leaving it a single-phase. However, the values corresponding to the output impedances of the phases become 3 times the case of the single phase.

The case of rectifying the output of this electrostatic induction generator 1101 through the full wave rectifying circuit 20 for all of the three phases and driving a constant voltage load was analyzed by computer simulation. As a result, when current of a waveform such as shown in FIG. 27 flows as a load current and in particular the terminal voltage of the constant voltage load (load voltage $V_L$) is about 0.792 of the half amplitude V0 of the power generation voltage (so-called phase voltage) of each phase, the average power consumed by the load per 1 cycle of power generation (time duration $2\cdot\pi/\omega$) became maximum. This maximum charging power is about 97.2% of the maximum extracted power in the case of connecting the output impedance of this generator and a balanced resistance load.

That is, regarding the basic wave component of the power generation output of the electrostatic induction generator, when driving the constant voltage load through the ideal rectifying circuit, the power which can be taken out from the load is improved to about 97% of the logical maximum. The efficiency in the case where the size and air gap distance of the rotor and stator in the prior art are the same as the present embodiment and the output is a single-phase output was about 92%. This amount of improvement is an effect due to there being no time at which the power generation voltage component substantially applied from the electrostatic induction generator 1101 to the constant voltage load circuit 1102 becomes 0 and the ripple width of the current flowing into the load becomes small. In this charging circuit, the power consumption at the constant voltage load circuit 1102 corresponds to the charging power to the charge storing means 22, so it is clear that this corresponds to the charging efficiency being improved.

In the above case, the step-down ratio "n"=6 and the terminal voltage $V_{BT}$ of charge storing means 22 is 1.5V, so the load voltage $V_L$=1.5×6=9.0V. On the other hand, the power generation voltage V0 of the individual phases (phase voltage) was 11.6V. Accordingly, this ratio becomes 9.0/11.6=0.777. The power extraction efficiency at this time is 97.2%. It is possible to operate the charging circuit 1100 at a load operating point substantially equal to the maximum efficiency point of this system. That is, when setting the voltage $V_L$ so that the difference between the local maximums and local minimums of the current driving the constant voltage load becomes smaller, the efficiency of power extraction to the constant voltage load becomes extremely high.

As shown in FIG. 25, the electrostatic induction generator 1101 in this embodiment is configured as a so-called star-connection generator. According to the well known alternating current circuit logic, it is known that the substantive power generation output of a star-connection three-phase alternating current generator becomes $\sqrt{3}$ times the power generation voltage of the individual phases (phase voltage). This is the output voltage corresponding to the so-called interline voltage. In the embodiment of this electrostatic induction generator, the power generation voltage of the individual phases is the same as the single-phase generator of the prior art (FIGS. 18 and 19), so compared with use as a single-phase generator such as a conventional generator, the substantive power generation voltage becomes $\sqrt{3}$ times as is.

In the actual full wave rectifying circuit 20, at the time of rectification, a voltage drop of the amount of forward direction voltage of the diodes occurs. The forward direction voltage per diode used here is a substantially constant voltage of about 1.0V. This forward direction voltage is deemed to be the power generation voltage offset to the reduced side, but by the substantive power generation voltage increasing by $\sqrt{3}$, this amount of offset is relatively reduced. That is, by three-phase output of the electrostatic induction generator as in the present embodiment, the effect is also obtained of the effect of the forward direction voltage of the diodes in the full wave rectifying circuit 20 being lowered and the loss in the rectifying circuit being greatly reduced. In practical use, this effect of reduction of the effect of the forward direction voltage of the diodes is particularly large. Accordingly, even if not made a three-phase alternating current output generator like in the present embodiment, by just configuring the generator so that the substantive output voltage can be made larger, the effect of improvement of the efficiency of extraction of power from the electrostatic induction generator is obtained.

Figure 28:
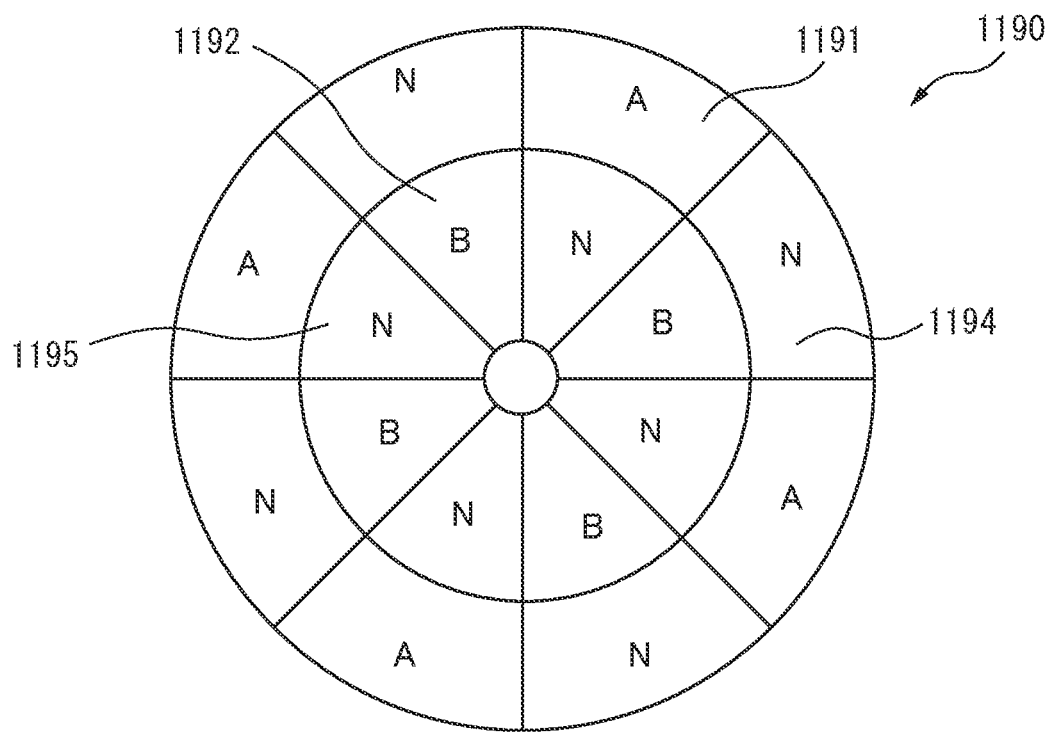
FIG. 28 is a plan view showing another configuration of the stator.

An example focusing on lowering the effect of the forward direction voltage of the diodes will be briefly explained. FIG. 28 shows another example of the stator in the example of three-phase output generator explained above. In this example, the small electrode of the stator 1190 is divided as shown in FIG. 28. That is, two ring-shaped regions of the inner circumference side and outer circumference side are provided. Furthermore, the ring-shaped regions are respectively divided into eight C-fan shaped small electrodes. In this example, the outside ring-shaped region corresponds to the A-phase, the inside ring-shaped region corresponds to the B-phase, and, in particular, the phase of arrangement of the A-phase and the B-phase is made a phase angle of 180°. That is, seen from the center of the stator 1190, the A-phase electrodes 1191 and the B-phase common electrodes 1195 are arranged on the same line, while the B-phase electrodes 1192 and the A-phase common electrodes 1194 are arranged on the same line. Further, the small electrodes all become the same areas. The A-phase electrode 1191 and the B-phase electrode 1192 become output terminals in this example of the generator. On the other hand, while not shown, all of the A-phase common electrodes 1194 and B-phase common electrodes 1195 are connected in the board to obtain the neutral line N.

By arranging and connecting a plurality of small electrodes in this way, even when making the above-mentioned rotor 180 rotate clockwise in a state facing this stator 190, a power generation waveform delayed by a phase angle of 180° from the power generation waveform appearing at the A-phase electrodes 1191 appears at the B-phase electrodes 1192. The voltage amplitudes of the phases are equal, so characteristics are obtained equal to those of serially arranging two generators with double the resistance values corresponding to the output impedance. Furthermore, the two generators are synchronized in power generation phases, so as a result, while the same in size etc. as a conventional generator, a generator corresponding to a single-phase generator with two times the voltage amplitude and four times the output impedance is obtained.

In the same way as the example of the three-phase output generator explained previously, a full wave rectifying circuit may also be connected to this generator and utilized for rectifying the power generation output. The forward direction voltage of the diodes used for the full wave rectifying circuit is deemed as the power generation voltage offset to the side decreasing it, but by the substantive power generation voltage increasing two-fold in this way, the amount of offset is relatively reduced. That is, by configuring the stator of the electrostatic induction generator as in this example, the effect is obtained of lowering the effect of the forward direction voltage of the diodes in the full wave rectifying circuit 20 and enabling a further reduction of the loss at the rectifying circuit.

Here, in addition to the electrical effect explained above, the mechanical effect obtained by the electrode configuration of the electrostatic induction generator of the present embodiment will be explained. First, the holding torque at the electrostatic induction generator of the prior art (FIGS. 18 and 19) will be explained qualitatively. Next, referring to FIG. 23, the fact that the holding torque of the electrostatic induction generator of the present embodiment becomes ⅓ that of the prior art will be explained.

A conventional electrostatic induction generator is configured so that the stator and rotor rotate while facing each other, but seen from the output terminals, it is possible to view this as a capacitor having the air layer of the air gap and the electrically charged thin films as a dielectric material. The electrically charged thin films store the fixed charge due to the charging, so in this system, an electrostatic potential is generated due to the electrostatic attraction force (Coulomb force). If the fixed charge is "q" and the electrostatic capacitance of the output capacitor is C, the electrostatic potential U is simply expressed by $U=q \cdot q/(2 \cdot C)$.

In such a system, in general, the place where the electrostatic potential becomes minimal becomes a stable point dynamically. The size of the fixed charge "q" is determined at the time of charging, so is constant. On the other hand, the electrostatic capacity C fluctuates, though slightly, due to the rotational position of the stator. This is because the electrostatic capacity present parasitically (parasitic capacitance, stray capacitance) differs depending on the position of the rotor.

On the surface of the stator, there are non-conductive lines for separating the small electrodes. At the parts of these separating lines, almost no charge is induced by electrostatic induction, so the contribution to the electrostatic capacity C can be said to be small. Therefore, seen from above, when the rotor is at a rotation position not straddling such a separating line, the electrostatic capacity C becomes the largest.

In FIG. 19(b), for example, the position shown as the broken line 3 is the rotation position where an electrically charged film (rotor) exactly faces an A-phase electrode (stator). When there is an electrically charged film at the rotation position of this position, the electrostatic potential U becomes minimal. This position is a mechanically stable point, so a torque in a direction pulling back the rotor to the original position, that is, a so-called holding torque, is generated if trying to make the rotor rotate in either direction from this position. In this example, from the symmetry of the counter electrodes (stator) 2, it is clear that the period of the stable rotation position where the electrostatic potential becomes minimal is every 45°.

Next, referring again to FIG. 23, the holding torque at the electrostatic induction generator of the present embodiment will be explained. This electrostatic induction generator, as explained above, is configured to rotate with the stator 190 and rotor 180 facing each other, but here consider the state where the rotor 180 stops at the position where charging region of the rotor 180 exactly faces and overlaps the region on the stator 190 shown as T in FIG. 23.

At the ring-shaped region of the C-phase becoming the innermost circumference of the stator 190, if focusing on the state of overlap of this with the region T, since the stable point at the side increasing the overlap with the C-phase common electrode 196 is close, it will be understood that a torque acts pulling back the rotor in the clockwise direction. On the other hand, for the ring-shaped region of the B-phase, since the stable point at the side increasing the overlap with the B-phase common electrode 195 is close, it will be understood that a torque acts pulling back the rotor in the counterclockwise direction.

In particular, from the symmetry of arrangement of the small electrodes, the area by which the C-phase common electrodes 196 overlap the region T and the area by which the B-phase common electrodes 195 overlap the region T are equal, so the two pullback torques become equal in magnitude and exactly cancel each other out.

Regarding the A-phase ring-shaped region at the outermost circumference of the stator 190, if focusing on the state of overlap of this with the region T, it will be understood that this position becomes the stable point. However, compared with the prior art, the overlapping area becomes only ⅓, so the torque trying to pull back to rotor to the original position when trying to make the rotor rotate from this position becomes ⅓.

Accordingly, as clear if focusing on each ring-shaped region and considering the sum of the torques acting on the locations of the facing rotor 180, it will be understood that the holding torque acting so as to stop the rotor 180 at the stable position becomes ⅓ that of the past. However, the period of this stable position is ½ of the conventional one shown in FIGS. 19, that is, every 15°.

From the above, according to the electrostatic induction generator of the present embodiment, it is learned that by dividing the electrode surface of the stator into ring shapes with good symmetry, it is possible to reduce the holding torques caused by the Coulomb forces acting between the rotor and stator and as a result the mechanical effect is obtained of ease of start of rotation by the rotor when a rotational torque is applied from the outside.

Figure 29:
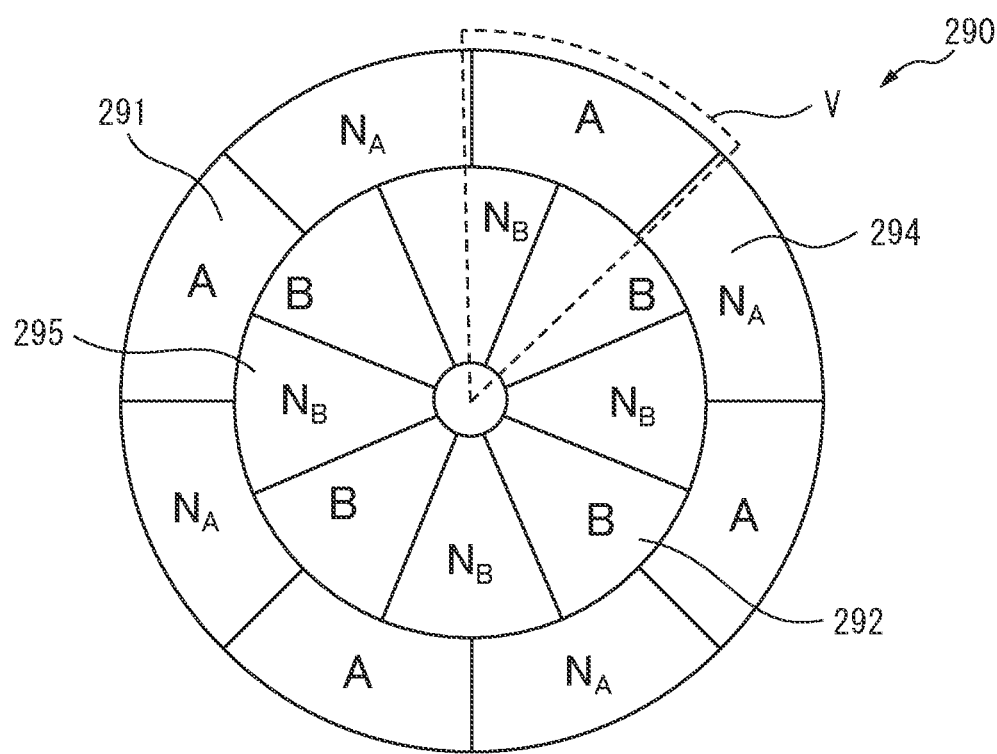
FIG. 29 is a plan view showing still another configuration of the stator.

An example of the typical arrangement of electrodes of a stator for obtaining just this mechanical effect is shown in FIG. 29. Such a stator 290 has two ring-shaped regions: an inner circumference and an outer circumference, but when looking from the ring-shaped region at the outer circumference corresponding to the A-phase, the phase of arrangement of the small electrodes in the ring-shaped region at the inner circumference corresponding to the B-phase is made exactly ½ of the center angles of the small electrodes, that is, 22.5°.

FIG. 29 showed the region V as an example of the position where the charging region of the rotor stops. In the same way as the above explanation, if focusing on the state of overlap of the region V for the small electrodes of the stator 290 of the A-phase electrodes 291, B-phase electrodes 292, A-phase common electrodes 294, and B-phase common electrodes 295, it will be understood that this position becomes the stable point of the rotor. However, compared with the past, the overlap area itself is only ½, so it is clear that the torque pulling back the rotor to the original position when trying to make the rotor rotate from that position also becomes ½.

Above, the electrostatic induction generator of the present embodiment was explained, but the scope of the invention is not limited to the content described above. For example, in the above explanation, the generator was configured as a star-connection three-phase generator, but it may also be configured as a so-called delta-connection type.

The present embodiment includes the following embodiment: an electrostatic induction generator comprising a rotor having electrically charged parts and able to rotate and a stator facing the rotor over an air gap of a predetermined distance and having conductor parts, in which electrostatic induction generator, the electrically charged parts include a plurality of C-fan shaped regions with predetermined center angles arranged in a radial manner from a center of rotation of the rotor, the conductor parts include a plurality of ring-shaped regions arranged in concentric circles on the axis of center of rotation of the rotor, furthermore, the ring-shaped regions are respectively divided into pluralities of C-fan shaped small electrodes with center angles equal to the above center angles, adjoining small electrodes in one ring-shaped region are alternately connected to output terminals and common terminals of that ring-shaped region, and the same number of output terminals are provided as the number of the ring-shaped regions.

The angle of arrangement from the center of rotation of the small electrodes is a whole multiple of the angle divided by the number of the ring-shaped regions. The number of the ring-shaped regions may be made 3 so that the output terminal gives three alternating current power generation outputs. The number of the ring-shaped regions may be made 2 so that the output terminal gives two alternating current power generation outputs. The widths of the ring-shaped regions in the radial direction are respectively set so that the areas of all of the small electrodes become substantially equal. The common electrodes of the ring-shaped regions may be connected together to provide a neutral line and the output terminals may be connected to give a star-connection generator. The angles of arrangement of the small electrodes from the center of rotation may be a whole multiple of an angle of ½ of the center angle.

Furthermore, the present embodiment includes an embodiment having the following configuration. It may also be a charging circuit comprising a full wave rectifying circuit connected to an output of an electrostatic induction generator and a constant voltage load circuit connecting to an output of the full wave rectifying circuit and becoming a substantially constant voltage supply, characterized in that the current rectified in one direction by the full wave rectifying circuit is used to charge the constant voltage load circuit. This charging circuit is characterized by setting the terminal voltage of the constant voltage load circuit so that when the power generation of the electrostatic induction generator is in the steady state, the ripple width of the current rectified in one direction becomes smaller.

Note that, the technical scope of the present invention is not limited to the above-mentioned embodiments and includes various changes made to the above embodiments within an extent not deviating from the gist of the present invention. That is, the specific constitutions mentioned in the embodiments are just a few examples and can be suitably changed.

REFERENCE SIGNS LIST 1. counter board
2. counter electrode
3, 3', 3". electrically charged film
4. rotating member
8. shaft
10. rotating weight
14, 15. gear
20. rectifying circuit
21. gear drive part
22. secondary cell
24. crystal
25. dial
30. step-down circuit
33, 34. housing
A, B, C. first electrode
NA, NB, NC. second electrode
200. quartz movement

The invention claimed is:

1. An electrostatic induction generator comprising:
a housing;
a first board fixed to said housing;
a second board arranged in parallel to said first board to be able to move relative to said first board;
electrically charged films;
counter electrodes; and
output parts outputting an alternating current generated between said electrically charged films and counter electrodes, wherein
said counter electrodes are set at a first facing surface of the first board,
said electrically charged films are set at every other constant interval at a second facing surface of said second board so as to face said counter electrodes,
said counter electrodes are comprised of pluralities of first electrodes and second electrodes provided separated from each other at said first facing surface,
said first electrodes and said second electrodes are alternately arranged along said direction of movement at said constant intervals in a single line,
said first electrodes and said second electrodes are respectively connected with each other,
said first electrodes and said second electrodes are respectively connected to said output parts, and
at said first facing surface, a plurality of said single lines of said first electrodes and said second electrodes are set, and said constant intervals of said plurality of lines respectively differ in phase.

2. The electrostatic induction generator according to claim 1, wherein
said second board is provided with a shaft, and
said shaft is supported to be able to rotate by a top bearing part and bottom bearing part provided at said housing.

3. An electrostatic induction generator comprising:
a housing;
a first board fixed to said housing;
a second board arranged in parallel to said first board to be able to move relative to said first board;
electrically charged films;
counter electrodes; and
output parts outputting an alternating current generated between said electrically charged films and counter electrodes, wherein
said counter electrodes are set at a first facing surface of the first board,
said electrically charged films are set at every other constant interval at a second facing surface of said second board so as to face said counter electrodes,
said counter electrodes are comprised of pluralities of first electrodes and second electrodes provided separated from each other at said first facing surface, said first electrodes and said second electrodes are alternately arranged along said direction of movement at said constant intervals in a single line, said first electrodes and said second electrodes are respectively connected with each other, said first electrodes and said second electrodes are respectively connected to said output parts, at said first facing surface, a plurality of said single lines of said first electrodes and said second electrodes are set, and said constant intervals of said plurality of lines are all the same in phase, and, at said second facing surface, a single line of electrically charged films comprised of said electrically charged films set at every other constant interval is made to face each of said plurality of lines of said first electrodes and said second electrodes, and said constant intervals of the respective single lines of electrically charged films respectively differ in phase.

4. The electrostatic induction generator according to claim 3, wherein said second board is provided with a shaft, and said shaft is supported to be able to rotate by a top bearing part and bottom bearing part provided at said housing.

5. The electrostatic induction generator according to claim 2, wherein said shaft or said second board is directly provided with a rotating weight having an uneven balance of weight or is configured so that rotation of a rotating weight is transmitted through a gear train to said shaft.

6. The electrostatic induction generator according to claim 1, wherein all of said plurality of lines of said first electrodes and said second electrodes are equal in area.

7. The electrostatic induction generator according to claim 1, wherein at said first facing surface, two or three of said single lines of said first electrodes and said second electrodes are set, and two- or three-phase alternating current is output to the output parts.

8. A board having said first board used for an electrostatic induction generator according to claim 2, wherein, at said first facing surface of said first board, either of said first electrodes and said second electrodes in said one line set at the outermost circumference, are connected together by patterns at the outermost peripheral edge of said first board, either of said first electrodes and said second electrodes in said one line set at the innermost circumference, are connected together by patterns at the innermost peripheral edge of said first board, and the other electrodes are connected together through thru-holes at the back side of said first facing surface of said first board.

9. The board according to claim 8, wherein all of said first electrodes and said second electrodes of said plurality of lines are equal in area.

10. The electrostatic induction generator according to claim 1, wherein said second board engages in translational motion with respect to said first board.

11. A system comprising:

an electrostatic induction generator having:

a rotor having electrically charged parts and able to rotate, and a stator facing said rotor over an air gap of a predetermined distance from said rotor and having conductor parts, wherein said electrically charged parts comprise a plurality of C-fan shaped regions with predetermined center angles arranged in a radial manner from a center of rotation of said rotor, said conductor parts comprise a plurality of ring-shaped regions arranged in concentric circles from a position on the axis of center of rotation of said rotor, said ring-shaped regions are respectively divided into a plurality of C-fan shaped small electrodes with center angles equal to the above center angles, adjoining small electrodes in one said ring-shaped region are alternately connected to output terminals and common terminals of said ring-shaped region, and the same number of output terminals as the said ring-shaped regions are provided, a full wave rectifying circuit connected to said output terminals; and a constant voltage load circuit forming a voltage supply of a substantially constant voltage connected to the output of said full wave rectifying circuit are provided, wherein the current rectified in one direction by said full wave rectifying circuit is used to charge said constant voltage load circuit.

12. The electrostatic induction generator according to claim 4, wherein said shaft or said second board is directly provided with a rotating weight having an uneven balance of weight or is configured so that rotation of a rotating weight is transmitted through a gear train to said shaft.

13. The electrostatic induction generator according to claim 3, wherein all of said plurality of lines of said first electrodes and said second electrodes are equal in area.

14. The electrostatic induction generator according to claim 3, wherein at said first facing surface, two or three of said single lines of said first electrodes and said second electrodes are set, and two- or three-phase alternating current is output to the output parts.

15. A board having said first board used for an electrostatic induction generator according to claim 4, wherein, at said first facing surface of said first board, either of said first electrodes and said second electrodes in said one line set at the outermost circumference, are connected together by patterns at the outermost peripheral edge of said first board, either of said first electrodes and said second electrodes in said one line set at the innermost circumference, are connected together by patterns at the innermost peripheral edge of said first board, and the other electrodes are connected together through thru-holes at the back side of said first facing surface of said first board.

16. The board according to claim 15, wherein all of said first electrodes and said second electrodes of said plurality of lines are equal in area.

17. The electrostatic induction generator according to claim 3, wherein said second board engages in translational motion with respect to said first board.

* * * * *